US012256373B2

(12) United States Patent
Taherzadeh Boroujeni et al.

(10) Patent No.: US 12,256,373 B2
(45) Date of Patent: Mar. 18, 2025

(54) BEAM-DEPENDENT SYSTEM INFORMATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US)

( * ) Notice: Subject to any disclaimer, the term of this patent is extended or adjusted under 35 U.S.C. 154(b) by 230 days.

(21) Appl. No.: 17/446,772

(22) Filed: Sep. 2, 2021

(65) Prior Publication Data

US 2022/0078819 A1 Mar. 10, 2022

Related U.S. Application Data

(60) Provisional application No. 63/075,044, filed on Sep. 4, 2020.

(51) Int. Cl.
*H04W 72/1263* (2023.01)
*H04W 56/00* (2009.01)
(Continued)

(52) U.S. Cl.
CPC ..... *H04W 72/1263* (2013.01); *H04W 56/001* (2013.01); *H04W 68/005* (2013.01); *H04W 72/046* (2013.01); *H04W 74/0833* (2013.01)

(58) Field of Classification Search
CPC ........... H04W 72/1263; H04W 56/001; H04W 68/005; H04W 72/046; H04W 74/0833; H04W 68/02; H04W 48/12
See application file for complete search history.

(56) References Cited

U.S. PATENT DOCUMENTS

2018/0376511 A1* 12/2018 Tsai ................. H04W 74/0833
2019/0020448 A1 1/2019 John Wilson et al.
(Continued)

FOREIGN PATENT DOCUMENTS

WO WO-2018232743 A1 * 12/2018
WO WO-2019089281 A1 * 5/2019 ........... H04B 17/309

OTHER PUBLICATIONS

3GPP TS 38.331 Radio Resource Control Protocol specification v15.0.0 (Jul. 2020) (Year: 2020).*
(Continued)

*Primary Examiner* — Ayaz R Sheikh
*Assistant Examiner* — David Zhijun Sun

(57) ABSTRACT

Various aspects of the present disclosure generally relate to wireless communication. In some aspects, a user equipment (UE) may receive, from a base station, a first synchronization signal associated with a first beam, and receive, from the base station and based at least in part on the first synchronization signal, scheduling information. Accordingly, the UE may receive, from the base station and based at least in part on the scheduling information, first system information associated with the first beam. The first system information may be distinct from second system information associated with a second beam. Additionally, or alternatively, the UE may receive the first system information using one or more first reception parameters that are distinct from one or more second reception parameters for the second system information associated with the second beam. Numerous other aspects are provided.

22 Claims, 15 Drawing Sheets

(51) Int. Cl.
  *H04W 68/00*      (2009.01)
  *H04W 72/044*     (2023.01)
  *H04W 74/0833*    (2024.01)

(56) References Cited

U.S. PATENT DOCUMENTS

2019/0289639 A1* 9/2019 Frenger ............... H04W 72/046
2019/0327767 A1  10/2019 Islam et al.
2019/0357227 A1* 11/2019 Khirallah ............ H04W 72/542
2019/0364523 A1  11/2019 Wei et al.
2020/0288377 A1* 9/2020 Liu ....................... H04W 48/12
2021/0258065 A1* 8/2021 Wang .................. H04W 56/001

OTHER PUBLICATIONS

International Search Report and Written Opinion—PCT/US2021/071365—ISA/EPO—Dec. 20, 2021.

* cited by examiner

BEAM-DEPENDENT SYSTEM INFORMATION

CROSS-REFERENCE TO RELATED APPLICATION

This Patent application claims priority to U.S. Provisional Patent Application No. 63/075,044, filed on Sep. 4, 2020, entitled "BEAM-DEPENDENT SYSTEM INFORMATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for transmitting and receiving beam-dependent system information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, a first synchronization signal associated with a first beam. The method may further include receiving, from the base station and based at least in part on the first synchronization signal, scheduling information. The method may include receiving, from the base station and based at least in part on the scheduling information, first system information associated with the first beam, wherein the first system information is distinct from second system information associated with a second beam.

Some aspects described herein relate to a method of wireless communication performed by a base station. The method may include transmitting, to a UE, a first synchronization signal associated with a first beam. The method may further include transmitting, to the UE and based at least in part on the first synchronization signal, scheduling information. The method may include transmitting, to the UE and based at least in part on the scheduling information, first system information associated with the first beam, wherein the first system information is distinct from second system information associated with a second beam.

Some aspects described herein relate to a method of wireless communication performed by a UE. The method may include receiving, from a base station, a first synchronization signal associated with a first beam. The method may further include receiving, from the base station and based at least in part on the first synchronization signal, scheduling information. The method may include receiving, from the base station and based at least in part on the scheduling information, first system information associated with the first beam, wherein the first system information is received using one or more first reception parameters that are distinct from one or more second reception parameters for second system information associated with a second beam.

Some aspects described herein relate to a method of wireless communication performed by a base station. The method may include transmitting, to a UE, a first synchronization signal associated with a first beam. The method may further include transmitting, to the UE and based at least in part on the first synchronization signal, scheduling information. The method may include transmitting, to the UE and based at least in part on the scheduling information, first system information associated with the first beam, wherein the first system information is transmitted using one or more first reception parameters that are distinct from one or more second reception parameters for second system information associated with a second beam.

Some aspects described herein relate to an apparatus for wireless communication at a UE. The apparatus may include a memory and one or more processors coupled to the memory. The one or more processors may be configured to receive, from a base station, a first synchronization signal associated with a first beam. The one or more processors may be further configured to receive, from the base station and based at least in part on the first synchronization signal, scheduling information. The one or more processors may be configured to receive, from the base station and based at least in part on the scheduling information, first system information associated with the first beam, wherein the first system information is distinct from second system information associated with a second beam.

Some aspects described herein relate to an apparatus for wireless communication at a base station. The apparatus may include a memory and one or more processors coupled to the memory. The one or more processors may be configured to transmit, to a UE, a first synchronization signal associated with a first beam. The one or more processors may be further configured to transmit, to the UE and based at least in part on the first synchronization signal, scheduling information. The one or more processors may be configured to transmit, to the UE and based at least in part on the scheduling information, first system information associated with the first beam, wherein the first system information is distinct from second system information associated with a second beam.

Some aspects described herein relate to an apparatus for wireless communication at a UE. The apparatus may include a memory and one or more processors coupled to the memory. The one or more processors may be configured to receive, from a base station, a first synchronization signal associated with a first beam. The one or more processors may be further configured to receive, from the base station and based at least in part on the first synchronization signal, scheduling information. The one or more processors may be configured to receive, from the base station and based at least in part on the scheduling information, first system information associated with the first beam, wherein the first system information is received using one or more first reception parameters that are distinct from one or more second reception parameters for second system information associated with a second beam.

Some aspects described herein relate to an apparatus for wireless communication at a base station. The base station may include a memory and one or more processors coupled to the memory. The one or more processors may be configured to transmit, to a UE, a first synchronization signal associated with a first beam. The one or more processors may be further configured to transmit, to the UE and based at least in part on the first synchronization signal, scheduling information. The one or more processors may be configured to transmit, to the UE and based at least in part on the scheduling information, first system information associated with the first beam, wherein the first system information is transmitted using one or more first reception parameters that are distinct from one or more second reception parameters for second system information associated with a second beam.

Some aspects described herein relate to a non-transitory computer-readable medium that stores a set of instructions for wireless communication by a UE. The set of instructions, when executed by one or more processors of the UE, may cause the UE to receive, from a base station, a first synchronization signal associated with a first beam. The set of instructions, when executed by one or more processors of the UE, may further cause the UE to receive, from the base station and based at least in part on the first synchronization signal, scheduling information. The set of instructions, when executed by one or more processors of the UE, may cause the UE to receive, from the base station and based at least in part on the scheduling information, first system information associated with the first beam, wherein the first system information is distinct from second system information associated with a second beam.

Some aspects described herein relate to a non-transitory computer-readable medium that stores a set of instructions for wireless communication by a base station. The set of instructions, when executed by one or more processors of the base station, may cause the base station to transmit, to a UE, a first synchronization signal associated with a first beam. The set of instructions, when executed by one or more processors of the base station, may further cause the base station to transmit, to the UE and based at least in part on the first synchronization signal, scheduling information. The set of instructions, when executed by one or more processors of the base station, may cause the base station to transmit, to the UE and based at least in part on the scheduling information, first system information associated with the first beam, wherein the first system information is distinct from second system information associated with a second beam.

Some aspects described herein relate to a non-transitory computer-readable medium that stores a set of instructions for wireless communication by a UE. The set of instructions, when executed by one or more processors of the UE, may cause the UE to receive, from a base station, a first synchronization signal associated with a first beam. The set of instructions, when executed by one or more processors of the UE, may further cause the UE to receive, from the base station and based at least in part on the first synchronization signal, scheduling information. The set of instructions, when executed by one or more processors of the UE, may cause the UE to receive, from the base station and based at least in part on the scheduling information, first system information associated with the first beam, wherein the first system information is received using one or more first reception parameters that are distinct from one or more second reception parameters for second system information associated with a second beam.

Some aspects described herein relate to a non-transitory computer-readable medium that stores a set of instructions for wireless communication by a base station. The set of instructions, when executed by one or more processors of the base station, may cause the base station to transmit, to a UE, a first synchronization signal associated with a first beam. The set of instructions, when executed by one or more processors of the base station, may further cause the base station to transmit, to the UE and based at least in part on the first synchronization signal, scheduling information. The set of instructions, when executed by one or more processors of the base station, may cause the base station to transmit, to the UE and based at least in part on the scheduling information, first system information associated with the first beam, wherein the first system information is transmitted using one or more first reception parameters that are distinct from one or more second reception parameters for second system information associated with a second beam.

Some aspects described herein relate to an apparatus for wireless communication. The apparatus may include means for receiving, from a base station, a first synchronization signal associated with a first beam. The apparatus may further include means for receiving, from the base station and based at least in part on the first synchronization signal, scheduling information. The apparatus may include means for receiving, from the base station and based at least in part on the scheduling information, first system information associated with the first beam, wherein the first system information is distinct from second system information associated with a second beam.

Some aspects described herein relate to an apparatus for wireless communication. The apparatus may include means for transmitting, to a UE, a first synchronization signal associated with a first beam. The apparatus may further include means for transmitting, to the UE and based at least in part on the first synchronization signal, scheduling information. The apparatus may include means for transmitting, to the UE and based at least in part on the scheduling information, first system information associated with the first beam, wherein the first system information is distinct from second system information associated with a second beam.

Some aspects described herein relate to an apparatus for wireless communication. The apparatus may include means for receiving, from a base station, a first synchronization signal associated with a first beam. The apparatus may further include means for receiving, from the base station and based at least in part on the first synchronization signal, scheduling information. The apparatus may include means for receiving, from the base station and based at least in part on the scheduling information, first system information associated with the first beam, wherein the first system information is received using one or more first reception parameters that are distinct from one or more second reception parameters for second system information associated with a second beam.

Some aspects described herein relate to an apparatus for wireless communication. The apparatus may include means for transmitting, to a UE, a first synchronization signal associated with a first beam. The apparatus may further include means for transmitting, to the UE and based at least in part on the first synchronization signal, scheduling information. The apparatus may include means for transmitting, to the UE and based at least in part on the scheduling information, first system information associated with the first beam, wherein the first system information is transmitted using one or more first reception parameters that are distinct from one or more second reception parameters for second system information associated with a second beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
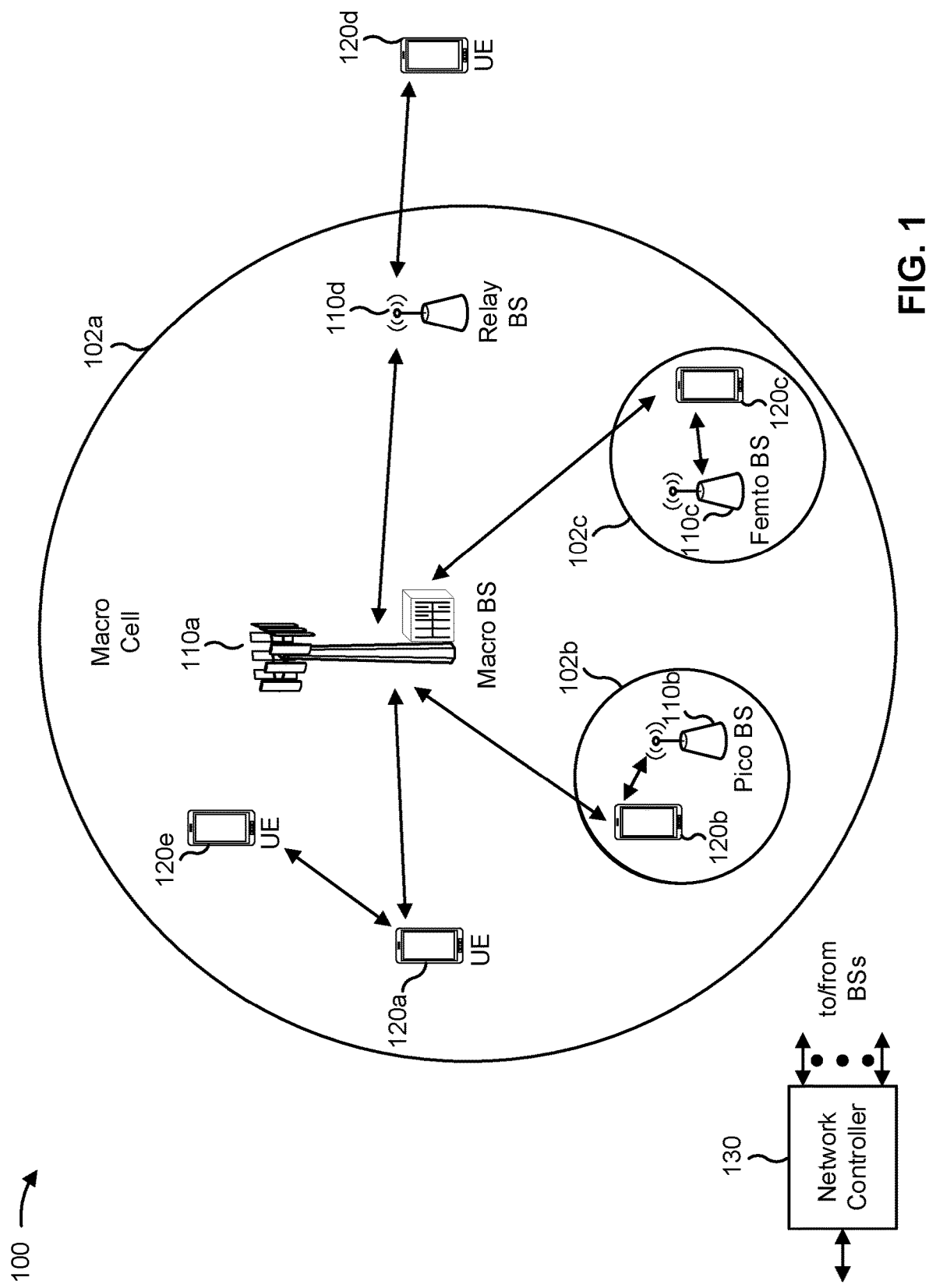
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" or "mmW" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
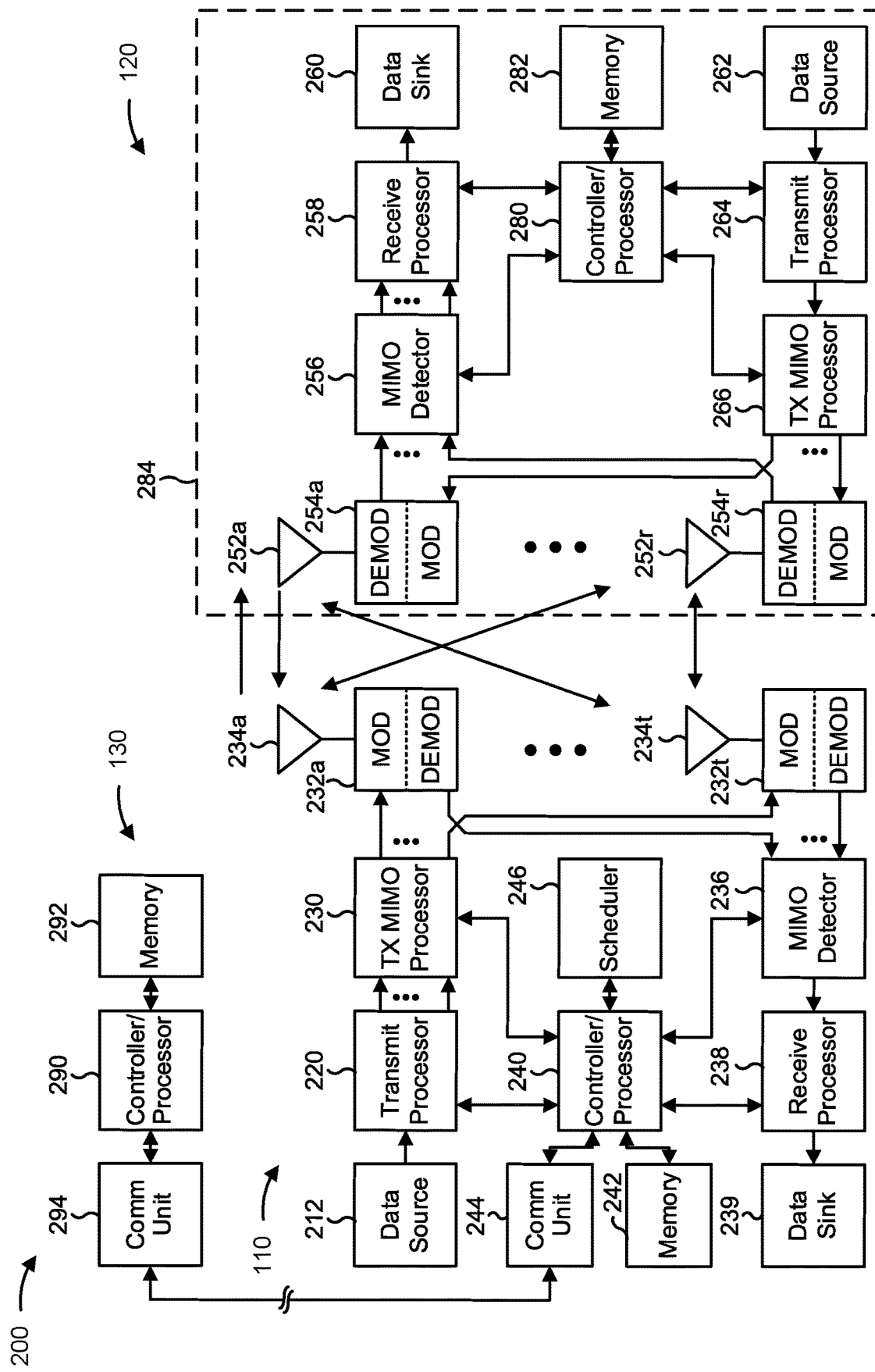
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., Toutput symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with transmitting and receiving beam-dependent system information, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120 and/or apparatus 1300 of FIG. 13) may include means for receiving, from a base station (e.g., base station 110 and/or apparatus 1400 of FIG. 14), a first synchronization signal associated with a first beam; means for receiving, from the base station and based at least in part on the first synchronization signal, scheduling information; and/or means for receiving, from the base station and based at least in part on the scheduling information, first system information associated with the first beam, wherein the first system information is distinct from second system information associated with a second beam. The means for the UE to perform operations described herein may include, for example, one or more of antenna 252, modem 254, MIMO detector 256, receive processor 258, transmit processor 264, TX MIMO processor 266, controller/processor 280, or memory 282. Additionally, or alternatively, the UE may include means for receiving, from the base station and based at least in part on the scheduling information, first system information associated with the first beam, wherein the first system information is received using one or more first reception parameters that are distinct from one or more second reception parameters for second system information associated with a second beam.

In some aspects, a base station (e.g., base station 110 and/or apparatus 1400 of FIG. 14) may include means for transmitting, to a UE (e.g., UE 120 and/or apparatus 1300 of FIG. 13), a first synchronization signal associated with a first beam; means for transmitting, to the UE and based at least in part on the first synchronization signal, scheduling information; and/or means for transmitting, to the UE and based at least in part on the scheduling information, first system information associated with the first beam, wherein the first system information is distinct from second system information associated with a second beam. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246. Additionally, or alternatively, the base station may include means for transmitting, to the UE and based at least in part on the scheduling information, first system information associated with the first beam, wherein the first system information is transmitted using one or more first reception parameters that are distinct from one or more second reception parameters for second system information associated with a second beam.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
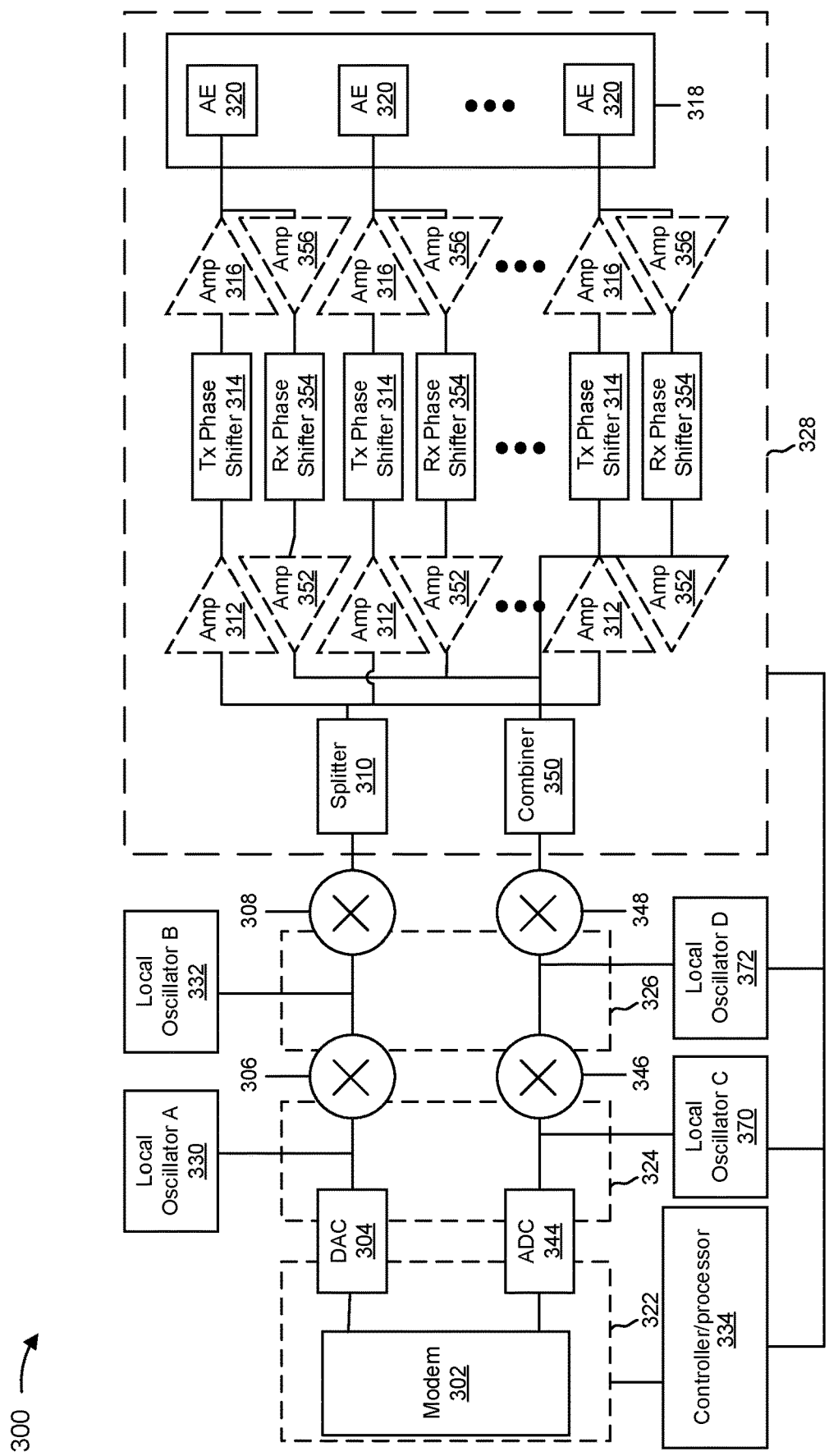
FIG. 3 is a diagram illustrating an example of beamforming architecture, in accordance with the present disclosure.

FIG. 3 is a diagram illustrating an example beamforming architecture 300 that supports beamforming for mmW communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312 and 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
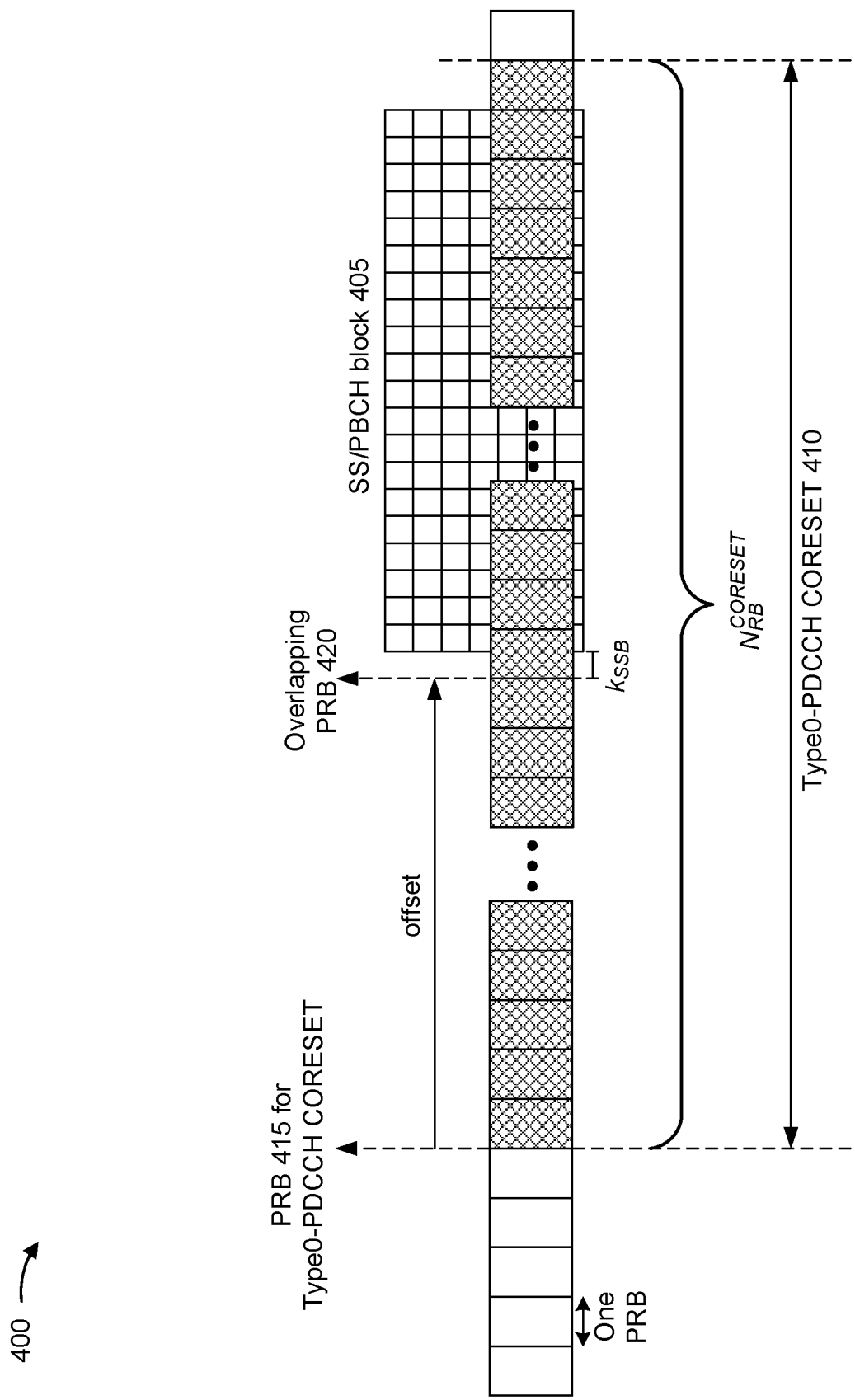
FIG. 4 is a diagram illustrating an example of search spaces for remaining minimum system information (RMSI) scheduling, in accordance with the present disclosure.

FIG. 4 is a diagram illustrating an example 400 of search spaces for RMSI scheduling, in accordance with the present disclosure. As shown in FIG. 4, a base station (e.g., base station 110) may broadcast a synchronization signal block (SSB) 405. The SSB 405 may include a PSS and an SSS centralized within a physical broadcast channel (PBCH). Accordingly, as shown in FIG. 4, the SSB 405 may also be referred to as an SS/PBCH block 405.

One or more UEs (e.g., UE 120a and/or UE 120b) may receive the SSB 405 in order to perform an initial cell search, radio resource measurements (RRM), radio link monitoring (RLM), and/or beam identification. For example, in beam identification, the UE 120a and the UE 120b may use different SSBs broadcast by the base station 110 to identify different beams used by the base station 110 (e.g., formed as described in connection with FIG. 3).

In some aspects, the UE 120a and the UE 120b may detect the PSS and/or the SSS to determine a physical cell identifier associated with the base station 110 and a timing associated with the PBCH. Accordingly, the UE 120a and the UE 120b may decode the PBCH to obtain a master information block (MIB). The MIB may include frequency and timing information to allow the UE 120a and the UE 120b to connect to the cell including the base station 110, as well as including information for scheduling reception of remaining minimum system information (RMSI) by the UE 120a and the UE 120b. For example, the MIB may include a pdcch-ConfigSIB1 data structure (e.g., as defined in 3GPP specifications and/or another standard) or another similar data structure defining a search space (e.g., in a physical downlink control channel (PDCCH)) in which the UE 120a and the UE 120b may receive scheduling information for the RMSI. This search space may be referred to as a Type0-PDCCH common search space (CSS).

In some aspects, the MIB may include information for a control resource set (CORESET) configuration defining physical resources (e.g., one or more frequencies, one or more slots, among other examples) for monitoring the Type0-PDCCH CSS. Accordingly, as shown in FIG. 4 the CORESET 410 may be referred to as VCORESET resource Type0-PDCCH CORESET 410. The CORESET 410 may include NRB blocks (RBs) starting with an initial physical resource block (PRB) (e.g., PRB 415 in FIG. 4). In some aspects, the MIB may indicate an offset from an overlapping PRB 420 between the SSB 405 and the Type0-PDCCH CORESET 410 to a lowest PRB for the Type0-PDCCH CORESET 410 (e.g., PRB 415 in FIG. 4). Additionally, the MIB may indicate an offset kssB (e.g., in ssb-Subcarrier-Offset, as defined in 3GPP specifications, and/or another similar variable) indicating a number of tones from a lowest subcarrier of the Type0-PDCCH CORESET 410 and the SSB 405 such that the UE 120a and the UE 120b may determine a PRB raster used by the base station 110 to transmit control information and data.

As indicated above, FIG. 4 is provided as an example. Other examples may differ from what is described with respect to FIG. 4.

Figure 5A:
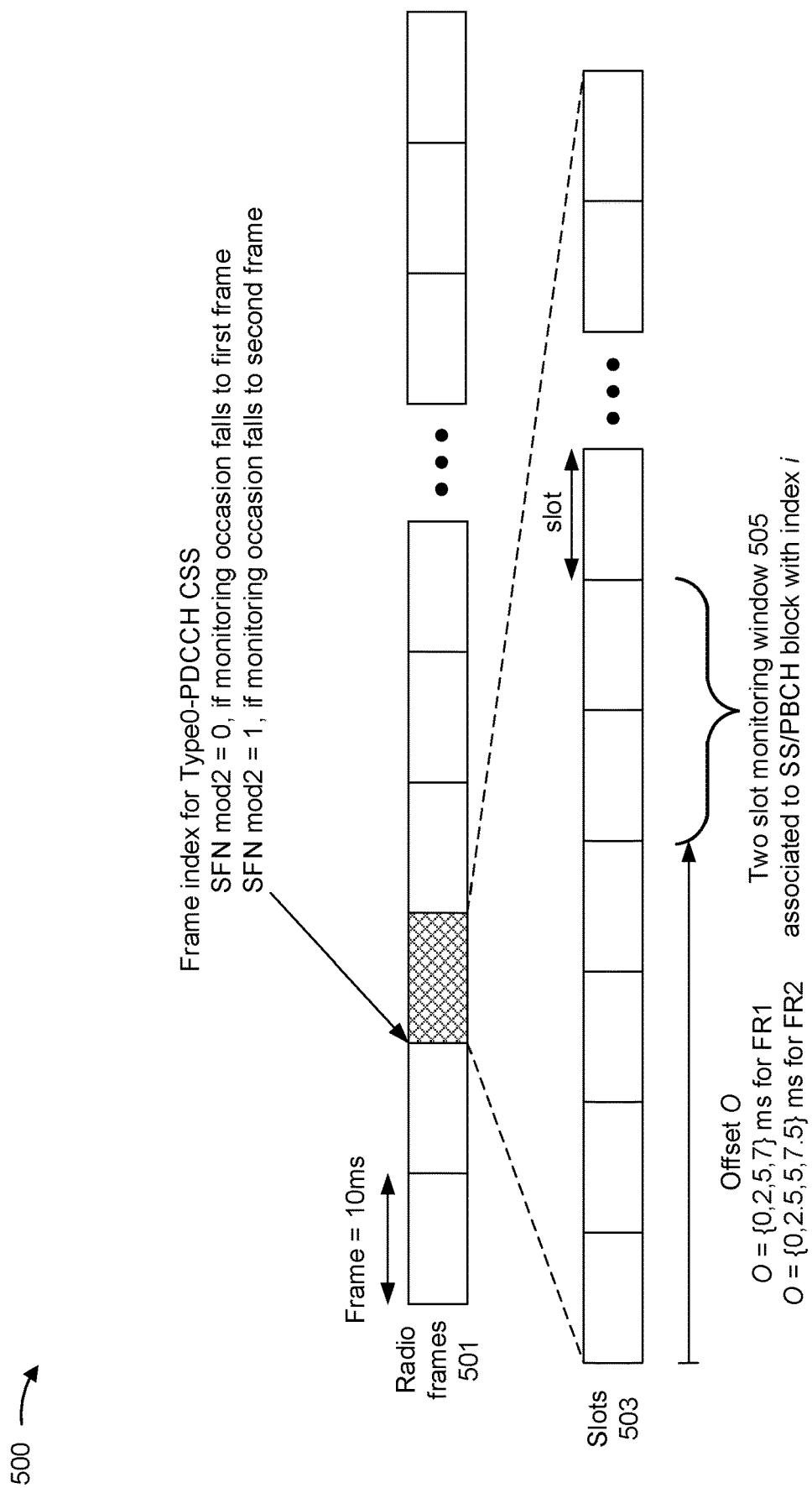
FIGS. 5A and 5B are diagrams illustrating examples of multiplexing synchronization signals with monitoring occasions for RMSI scheduling, in accordance with the present disclosure.
Figure 5B:
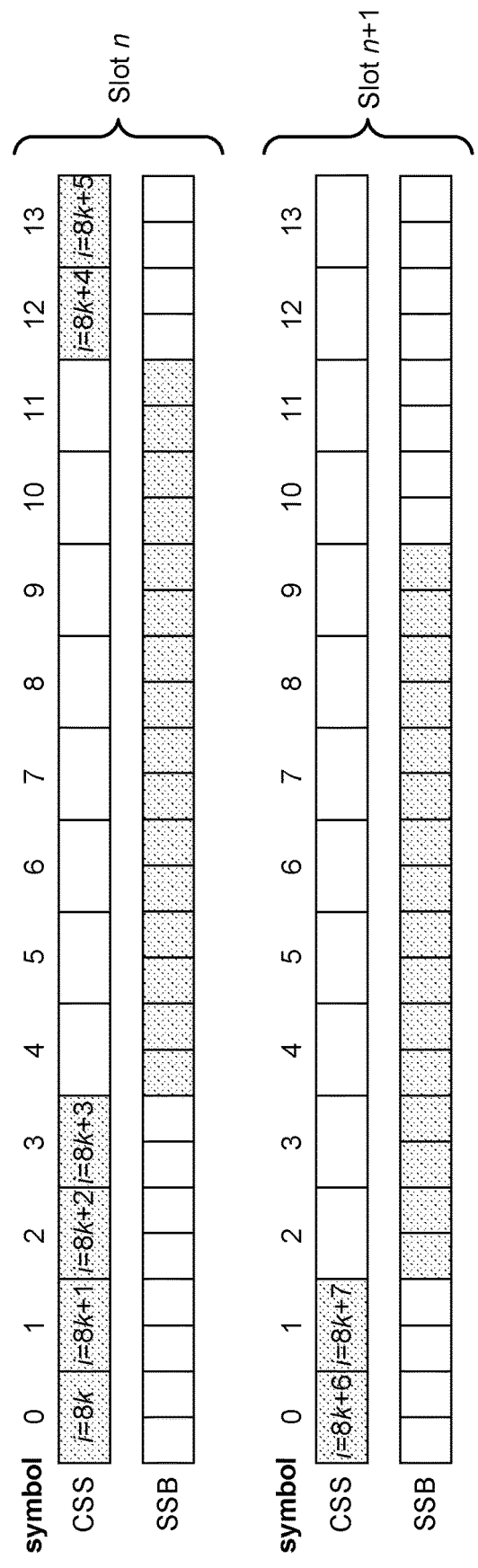

FIGS. 5A and 5B are diagrams illustrating examples 500 and 550, respectively, of multiplexing synchronization signals (e.g., SSBs, as described in connection with FIG. 4) with monitoring occasions for RMSI scheduling (e.g., monitoring occasions in a Type0-PDCCH CSS, as described in connection with FIG. 4), in accordance with the present disclosure. One or more UEs (e.g., UE 120a and/or UE 120b) may receive (e.g., from base station 110), within the monitoring occasions, scheduling information (e.g., on a PDCCH) that the UE 120a and the UE 120b use to receive (e.g., from the base station 110) a system information block (SIB) including the RMSI. In example 500, an SSB is time multiplexed with the Type0-PDCCH CSS. In example 550, an SSB is frequency multiplexed with the Type0-PDCCH CSS.

As shown in FIG. 5A, the Type0-PDCCH CSS may be defined within one or more radio frames of a set of radio frames 501 (e.g., each frame being 10 ms long). In some aspects, the Type0-PDCCH CSS may be configured for a first frame and every other frame thereafter (e.g., when a system fame number (SFN) mod 2=0). As an alternative, the Type0-PDCCH CSS may be configured for a second frame and every other frame thereafter (e.g., when an SFN mod 2=1). As further shown in FIG. 5A, each frame may include a plurality of slots 503 (e.g., 10 slots per frame, 20 slots per frame, among other examples).

In some aspects, as shown in FIG. 5A, the UE 120a and the UE 120b may monitor, for RMSI scheduling information, two slots 505 corresponding to a selected SSB. As further shown in FIG. 5A, the two slots 505 may follow an offset O defined in the MIB (e.g., as described in connection with FIG. 4). In example 500, the offset O for FR1 may be selected from 0, 2, 5, or 7 ms. Although the description herein focuses on these values for the offset O for FR1, the description similarly applies to other values for the offset O For example, as shown in FIG. 5A, the offset O for FR2 may be selected from 0, 2.5, 5, or 7.5 ms.

The selected SSB may have an associated index i. Accordingly, in some aspects, the UE 120a and the UE 120b may determine indices for the monitoring occasions associated with the selected SSB. For example, the UE 120a and the UE 120b may determine the indices based at least in part on an expression similar to the following form:

$$n_0 = (0.2 \cdot + 2^{\mu} \cdot M \bmod N_{slot}^{frame,\mu}),$$

where $n_0$ represents the index of the first of the two slots, O represents the offset (e.g., as described above), $\mu$ represents an index based on a quantity of slots per frame, i represents the index of the selected SSB, M represents a step index defined in the MIB (e.g., as described in connection with FIG. 4), and $N_{slot}^{frame,\mu}$ represents a quantity of slots per frame. In some aspects, the index of the second of the two slots may correspond to $n_0+1$.

As an alternative, and as shown in FIG. 5B, the Type0-PDCCH CSS may be defined within one or more symbols of a slot (e.g., slot n, slot n+1, and so on, as shown in FIG. 5B). In example 550, the Type0-PDCCH CSS may include symbol 0 (in slot n), 1 (in slot n), 2 (in slot n), 3 (in slot n), 12 (in slot n), 13 (in slot n), 0 (in slot n+1), or 1 (in slot n+1) for SSB indices 8k, 8k+1, 8k+2, 8k+3, 8k+4, 8k+5, 8k+6, and 8k+7, respectively, where k represents a counting number. As further shown in example 550, the Type0-PDCCH CSS may include symbols 0, 1, 2, and/or 3 in slot n when the SSB is transmitted in one or more of symbols 4-11 of the same slot n. Similarly, the Type0-PDCCH CSS may include symbols 0 and/or 1 in slot n+1 when the SSB is transmitted in one or more of symbols 2-9 of the same slot n+1. As an alternative, the Type0-PDCCH CSS may include symbols 12 and/or 13 in slot n when the SSB is transmitted in one or more symbols of the next slot n+1.

Although described in connection with using symbol 0 (in slot n), 1 (in slot n), 2 (in slot n), 3 (in slot n), 12 (in slot n), 13 (in slot n), 0 (in slot n+1), or 1 (in slot n+1) for SSB indices 8k, 8k+1, 8k+2, 8k+3, 8k+4, 8k+5, 8k+6, 8k+7, respectively, the description similarly applies to other symbols used for other SSB indices. For example, the Type0-PDCCH CSS may include symbols 2 and/or 3 in slot n when the SSB is transmitted in symbols 0 and/or 1 of the same slot n. As another example, the Type0-PDCCH CSS may include symbols 0, 1, 6, and/or 7 in slot n for SSB indices 4k, 4k+1, 4k+2, and 4k+3, respectively, where k is a counting number. Accordingly, the Type0-PDCCH CSS may include symbols 0 and/or 1 in slot n when the SSB is transmitted in one or more of symbols 2-5 of the same slot n, and the Type0-PDCCH CSS may include symbols 6 and/or 7 in slot n when the SSB is transmitted in one or more of symbols 8-11 of the same slot n.

In some aspects, the UE 120a and the UE 120b may measure different SSBs transmitted by the base station 110 and use an SSB associated with a strongest signal strength to obtain the RMSI. When the base station 110 uses beamforming (e.g., as described in connection with FIG. 3), the selection of an SSB by the UE 120a and the UE 120b may also constitute a selection of a beam corresponding to that SSB.

As indicated above, FIGS. 5A and 5B are provided as examples. Other examples may differ from what is described with respect to FIGS. 5A and 5B.

Figure 6:
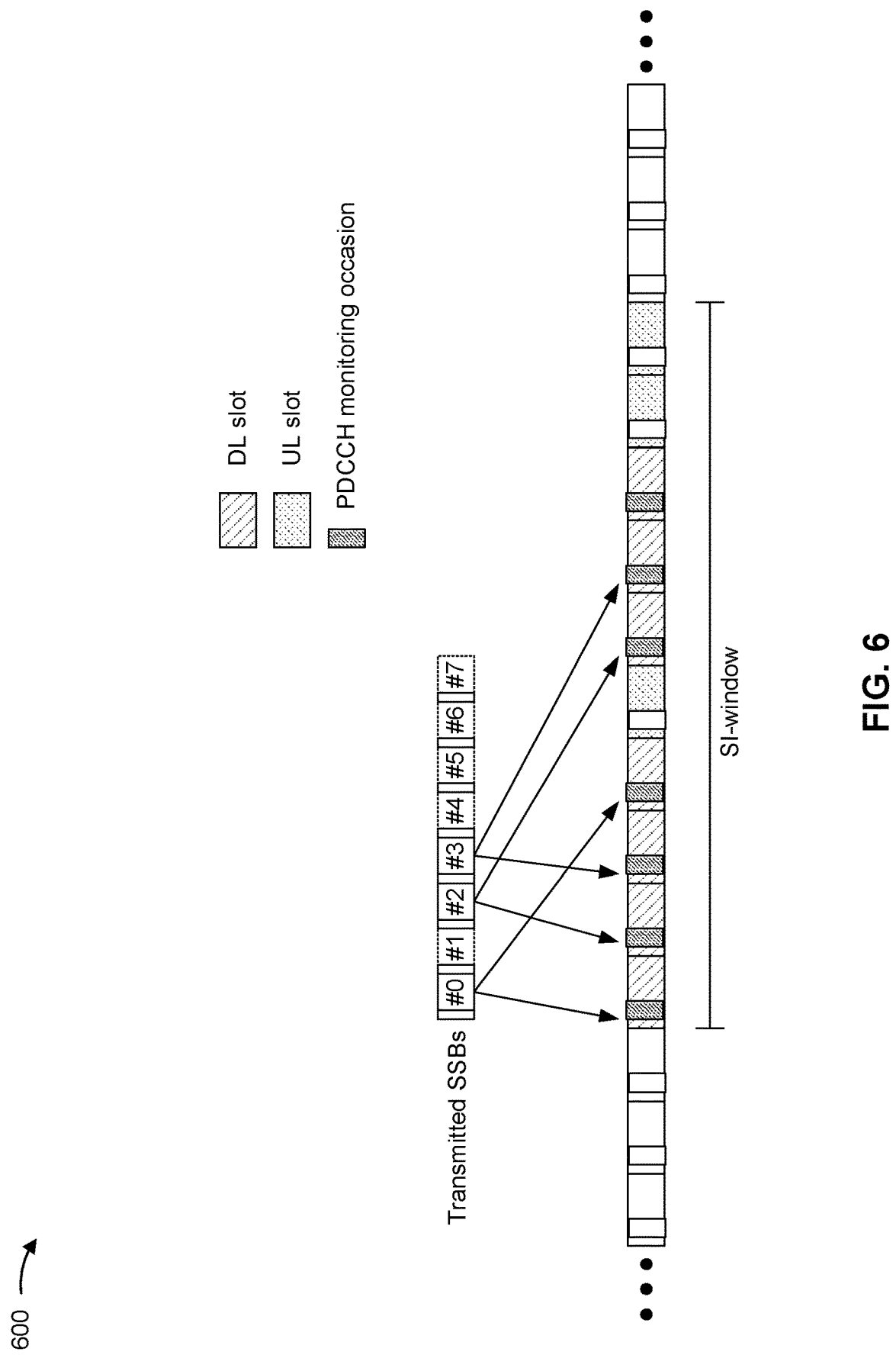
FIG. 6 is a diagram illustrating an example of search spaces for other system information (OSI) scheduling, in accordance with the present disclosure.

FIG. 6 is a diagram illustrating an example 600 of search spaces for OSI scheduling, in accordance with the present disclosure. One or more UEs (e.g., UE 120a and/or UE 120b) may receive (e.g., from base station 110), within the search space, scheduling information (e.g., on a PDCCH) that the UE 120a the UE 120b use to receive (e.g., from the base station 110) one or more SIBs including the OSI. This search space may be referred to as a Type0A-PDCCH CSS. The Type0A-PDCCH CSS may be defined using a corresponding SSB (e.g., as described in connection with FIG. 4) and/or corresponding RMSI (e.g., as described in connection with FIGS. 5A and 5B).

In some aspects, the base station 110 may configure a same multiplexing pattern between the SSB and the Type0A-PDCCH CSS as configured between the SSB and the Type0-PDCCH CSS (e.g., as described in connection with FIGS. 5A and 5B). For example, the base station 110 may set a searchSpace OtherSystemInformation field (e.g., as defined in 3GPP specifications and/or another standard) or another similar field, included in the RMSI, to zero in order to indicate that the UE 120a and the UE 120b may use the same CSS and CORESET to receive scheduling information for the OSI as the UE 120a and the UE 120b use to receive scheduling information for the RMSI. Accordingly, the base station 110 may time multiplex the OSI and the RMSI.

As an alternative, and as shown in FIG. 6, the base station 110 may configure a new multiplexing pattern between the SSB and the Type0A-PDCCH CSS. As shown in example 600, a transmitted SSBs (e.g., SSBs with indices 0, 2, and 3, as shown in FIG. 6) may map to one or more monitoring occasions (e.g., two monitoring occasions in example 600) that the base station 110 may use to transmit (e.g., on a PDCCH) scheduling information for the OSI. The one or more monitoring occasions may be in one or more downlink slots in which the UE 120a and the UE 120b may receive the OSI. Additionally, in some aspects, the one or more downlink slots may be distinct from one or more uplink slots used by the UE 120a and the UE 120b to transmit to the base station 110.

As an alternative, the base station 110 may use the RMSI to configure a random access channel (RACH) and/or another channel such that the UE 120a and the UE 120b may transmit a system information request message and receive, in response to the request message, the OSI. For example, the base station 110 may transmit scheduling information on the RACH that the UE 120a and the UE 120b use to receive the OSI on the RACH.

As indicated above, FIG. 6 is provided as an example. Other examples may differ from what is described with respect to FIG. 6.

Generally, a base station transmits the same RMSI for every SSB that the base station broadcasts. Similarly, the base station generally transmits the same OSI, using the RMSI, for every SSB that the base station broadcasts. In some situations, however, the base station may form different beams that benefit from coverage enhancements, such as different random access procedure configurations and/or different paging configurations, among other examples. Techniques and apparatuses described herein enable a base station (e.g., base station 110) to transmit system information (e.g., OSI, as described in connection with FIG. 6) differently for different synchronization signals (e.g., SSBs) and thus for different beams. As a result, the base station 110 may configure different UEs (e.g., UE 120*a* and/or UE 120*b*), that select different SSBs to use with the base station 110, with different random access procedure configurations and/or different paging configurations using the different OSI. Accordingly, the base station 110 and the UEs 120*a* and 120*b* experience increased reliability and/or quality of communications.

Figure 7:
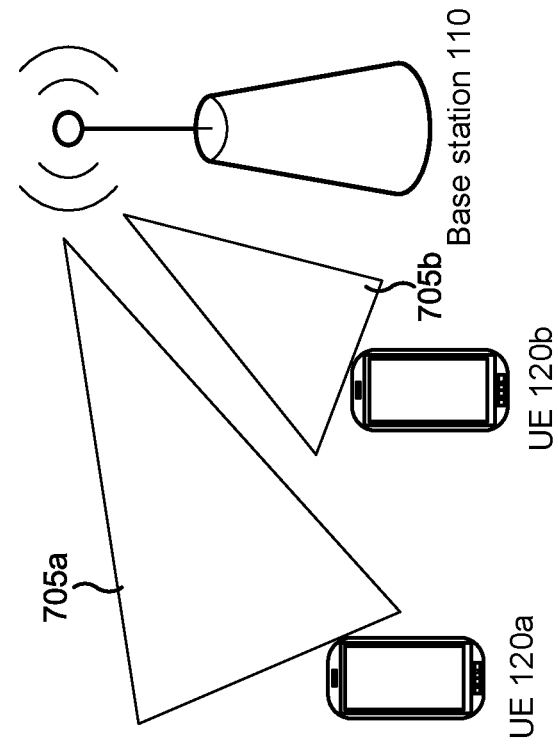
FIGS. 7 and 8 are diagrams illustrating examples associated with beam-dependent OSI, in accordance with the present disclosure.

FIG. 7 is a diagram illustrating an example 700 associated with beam-dependent system information, in accordance with the present disclosure. As shown in FIG. 7, example 700 includes communication between a base station 110, a UE 120*a*, and a UE 120*b*. In some aspects, the base station 110, the UE 120*a*, and the UE 120*b* may be included in a wireless network, such as wireless network 100. The base station 110 and UE 120*a* may communicate on a wireless access link, which may include an uplink and a downlink. Similarly, the base station 110 and UE 120*b* may communicate on a wireless access link, which may include an uplink and a downlink.

As further shown in FIG. 7, the base station 110 may use a plurality of beams (e.g., formed as described in connection with FIG. 3) on the wireless network 100. In example 700, the base station 110 may use a first beam 705*a* with the UE 120*a* and a second beam 705*b* with the UE 120*b*. For example, the UE 120*a* may measure a first synchronization signal (e.g., an SSB as described in connection with FIG. 4) associated with the first beam 705*a* and a second synchronization signal (e.g., an SSB as described in connection with FIG. 4) associated with the second beam 705*b* and determine to use the first beam 705*a* based at least in part on the measurements. Similarly, the UE 120*b* may measure the first synchronization signal associated with the first beam 705*a* and the second synchronization signal associated with the second beam 705*b* and determine to use the second beam 705*b* based at least in part on the measurements. Although the description herein focuses on two beams, the description similarly applies to additional beams (e.g., three beams, four beams as described in connection with FIG. 8, and so on). Additionally, or alternatively, although the description herein focuses on two-dimensional beams, the description similarly applies to three-dimensional beams (e.g., as described in connection with FIG. 8).

As described above, the base station 110 may transmit, and the UE 120*a* may receive, a first synchronization signal associated with the first beam 705*a*. For example, the UE 120*a* may receive an SSB (e.g., as described in connection with FIG. 4) associated with the first beam 705*a*. Accordingly, in some aspects, the UE 120*a* may decode the SSB to obtain MIB and a CORESET for receiving scheduling information for RMSI (e.g., as described in connection with FIG. 4).

Similarly, as described above, the base station 110 may transmit, and the UE 120*b* may receive, a second synchronization signal associated with the second beam 705*b*. For example, the UE 120*b* may receive an SSB (e.g., as described in connection with FIG. 4) associated with the second beam 705*b*. Accordingly, in some aspects, the UE 120*b* may decode the SSB to obtain MIB and a CORESET for receiving scheduling information for RMSI (e.g., as described in connection with FIG. 4).

In some aspects, the base station 110 may transmit, and the UE 120*a* may receive, based at least in part on the first synchronization signal, scheduling information. For example, the UE 120*a* may decode the SSB associated with the first beam 705*a* (e.g., as described in connection with FIGS. 5A and 5B) to obtain the scheduling information (e.g., RMSI). In some aspects, the scheduling information may indicate a CORESET for receiving the OSI.

Similarly, the base station 110 may transmit, and the UE 120*b* may receive, based at least in part on the second synchronization signal, the scheduling information. For example, the UE 120*a* may decode the SSB associated with the second beam 705*b* (e.g., as described in connection with FIGS. 5A and 5B) to obtain the scheduling information (e.g., RMSI). In some aspects, the scheduling information may indicate a CORESET for receiving the OSI.

In some aspects, the scheduling information may be associated with the first beam and the second beam. For example, the RMSI may be common to the first beam and the second beam.

The base station 110 may transmit, and the UE 120*a* may receive, based at least in part on the scheduling information, first system information associated with the first beam 705*a*. For example, the first system information may include OSI (e.g., as described in connection with FIG. 6) associated with the first beam 705*a*.

Similarly, the base station 110 may transmit, and the UE 120*b* may receive, based at least in part on the scheduling information, second system information associated with the second beam 705*b*. For example, the second system information may include OSI (e.g., as described in connection with FIG. 6) associated with the second beam 705*b*.

In some aspects, the first system information and the second system information may be distinct. Accordingly, the content of the first system information may differ from the content of the second system information.

For example, the first system information may indicate at least one first parameter associated with a random access procedure that is distinct from at least one second parameter indicated by the second system information. The at least one first parameter may include a random access repetition for a random access preamble, a random access repetition for a random access response (RAR), a length of an RAR window, and/or a quantity of segments for the RAR window, among other examples. Accordingly, the first system information may indicate more repetition, a longer RAR window, and/or additional segments for the RAR, among other examples, such that coverage for random access transmissions using the first beam 705*a* is improved as compared with coverage for random access transmissions using the second beam 705*b*. Additionally, or alternatively, the first system information may include at least one first parameter associated with a paging procedure that is distinct from at least one second parameter indicated by the second system information. The at least one first parameter may include a period associated with the paging procedure and/or a repetition associated with the paging procedure, among other examples. Accordingly, the first system information may indicate a shorter period and/or more repetition, among other examples, such that coverage for paging transmissions using the first beam 705a is improved as compared with coverage for paging transmissions using the second beam 705b.

Additionally, or alternatively, the UE 120a may receive the first system information using one or more first reception parameters that are distinct from one or more second reception parameters that the UE 120b uses to receive the second system information. Accordingly, the transmission method of the first system information may differ from the transmission method of the second system information.

For example, the one or more first reception parameters may include a repetition associated with the first system information and/or a period associated with the first system information, among other examples. Accordingly, the base station 110 may transmit the first system information with more repetition and/or a shorter period, among other examples, such that coverage for the first system information, transmitted using the first beam 705a, is improved as compared with coverage for the second system information, transmitted using the second beam 705b.

By using techniques as described in connection with FIG. 7, the base station 110 may transmit system information (e.g., OSI) with different content and/or different transmission methods for different beams. As a result, the base station 110 may configure different UEs (e.g., UE 120a and/or UE 120b) with different random access procedure configurations and/or different paging configurations in order to increase reliability and/or quality of communications between the base station 110 and the different UEs.

As indicated above, FIG. 7 is provided as an example. Other examples may differ from what is described with respect to FIG. 7.

Figure 8:
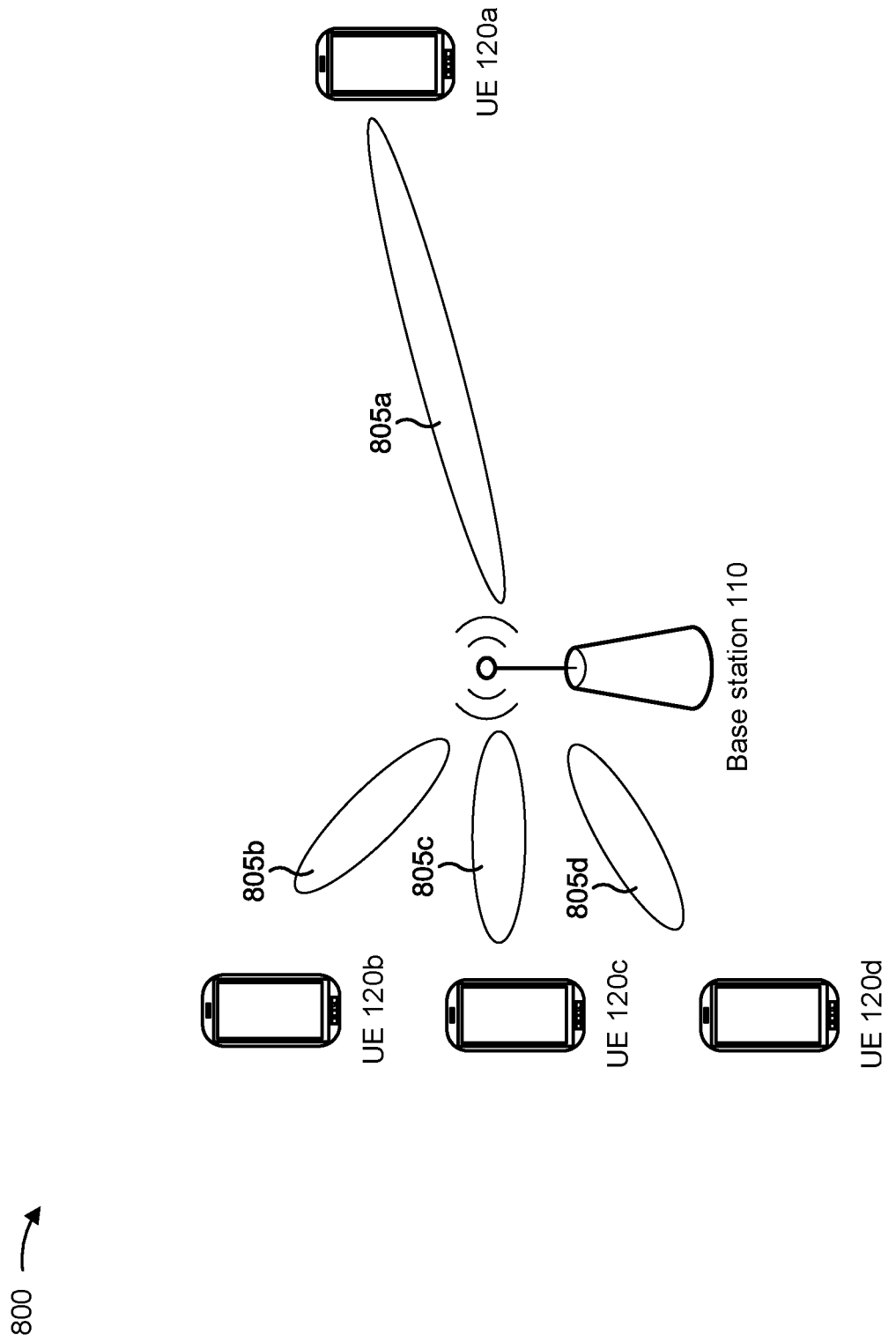

FIG. 8 is a diagram illustrating an example 800 associated with beam-dependent system information, in accordance with the present disclosure. As shown in FIG. 8, example 800 includes communication between a base station 110, a UE 120a, a UE 120b, a UE 120c, and a UE 120d. In some aspects, the base station 110, the UE 120a, the UE 120b, the UE 120c, and the UE 120d may be included in a wireless network, such as wireless network 100. The base station 110 and UE 120a may communicate on a wireless access link, which may include an uplink and a downlink. Similarly, the base station 110 and UE 120b may communicate on a wireless access link, the base station 110 and UE 120c may communicate on a wireless access link, and the base station 110 and UE 120d may communicate on a wireless access link.

As further shown in FIG. 8, the base station 110 may use a plurality of beams (e.g., formed as described in connection with FIG. 3) on the wireless network 100. In example 800, the base station 110 may use a first beam 805a with the UE 120a, a second beam 805b with the UE 120b, a third beam 805c with the UE 120c, and a fourth beam 805d with the UE 120d. For example, the UE 120a may measure a first synchronization signal (e.g., an SSB as described in connection with FIG. 4) associated with the first beam 805a, a second synchronization signal (e.g., an SSB as described in connection with FIG. 4) associated with the second beam 805b, a third synchronization signal (e.g., an SSB as described in connection with FIG. 4) associated with the third beam 805c, and a fourth synchronization signal (e.g., an SSB as described in connection with FIG. 4) associated with the fourth beam 805d, and determine to use the first beam 805a based at least in part on the measurements. The UE 120b, the UE 120c, and the UE 120d may perform similar procedures to select the second beam 805b, the third beam 805c, and the fourth beam 805d, respectively.

Although the description herein focuses on four beams, the description similarly applies to fewer beams (e.g., three beams or two beams) and/or additional beams (e.g., five beams, six beams, and so on). Additionally, or alternatively, although the description herein focuses on three-dimensional beams, the description similarly applies to two-dimensional beams (e.g., as described in connection with FIG. 7).

As described above, the base station 110 may transmit, and the UE 120a may receive, a first synchronization signal associated with the first beam 805a. For example, the UE 120a may receive an SSB (e.g., as described in connection with FIG. 4) associated with the first beam 805a. Accordingly, in some aspects, the UE 120a may decode the SSB to obtain MIB and a CORESET for receiving scheduling information for RMSI (e.g., as described in connection with FIG. 4).

Similarly, as described above, the base station 110 may transmit, and the UE 120b may receive, a second synchronization signal associated with the second beam 805b. Additionally, the base station 110 may transmit, and the UE 120c may receive, a third synchronization signal associated with the third beam 805c. Additionally, the base station 110 may transmit, and the UE 120d may receive, a fourth synchronization signal associated with the fourth beam 805d.

In some aspects, the base station 110 may transmit, and the UE 120a may receive, based at least in part on the first synchronization signal, scheduling information. For example, the UE 120a may decode the SSB associated with the first beam 705a (e.g., as described in connection with FIGS. 5A and 5B) to obtain the scheduling information (e.g., RMSI). In some aspects, the scheduling information may indicate a CORESET for receiving the OSI.

Similarly, the base station 110 may transmit, and the UE 120b may receive, based at least in part on the second synchronization signal, the scheduling information. The base station 110 may further transmit, and the UE 120c may receive, based at least in part on the third synchronization signal, the scheduling information. Additionally, the base station 110 may transmit, and the UE 120d may receive, based at least in part on the fourth synchronization signal, the scheduling information.

In some aspects, the scheduling information may be associated with the first beam, the second beam, the third beam, and the fourth beam. For example, the RMSI may be common to the first beam, the second beam, the third beam, and the fourth beam.

The base station 110 may transmit, and the UE 120a may receive, based at least in part on the scheduling information, first system information associated with the first beam 805a. For example, the first system information may include OSI (e.g., as described in connection with FIG. 6) associated with the first beam 805a.

Similarly, base station 110 may transmit, and the UE 120b may receive, based at least in part on the scheduling information, second system information associated with the second beam 805b. Additionally, the base station 110 may transmit, and the UE 120c may receive, based at least in part on the scheduling information, third system information associated with the third beam 805c. Additionally, the base station 110 may transmit, and the UE 120d may receive, based at least in part on the scheduling information, fourth system information associated with the fourth beam 805d.

In some aspects, the first system information may be distinct from the second system information, the third system information, and the fourth system information. Accordingly, the content of the first system information may differ from the content of the second system information, the content of the third system information, and the content of the fourth system information.

For example, the first system information may indicate at least one first parameter associated with a random access procedure that is distinct from at least one second parameter indicated by the second system information, at least one third parameter indicated by the third system information, and at least one fourth parameter indicated by the fourth system information. The at least one first parameter may include a random access repetition for a random access preamble, a random access repetition for an RAR, a length of an RAR window, and/or a quantity of segments for the RAR window, among other examples. Accordingly, the first system information May indicate more repetition, a longer RAR window, and/or additional segments for the RAR, among other examples, such that coverage for random access transmissions using the first beam 805a is improved as compared with coverage for random access transmissions using the second beam 805b, the third beam 805c, and/or the fourth beam 805d. Additionally, or alternatively, the first system information may include at least one first parameter associated with a paging procedure that is distinct from at least one second parameter indicated by the second system information, at least one third parameter indicated by the third system information, and at least one fourth parameter indicated by the fourth system information. The at least one first parameter may include a period associated with the paging procedure and/or a repetition associated with the paging procedure, among other examples. Accordingly, the first system information may indicate a shorter period and/or more repetition, among other examples, such that coverage for paging transmissions using the first beam 805a is improved as compared with coverage for paging transmissions using the second beam 805b, the third beam 805c, and/or the fourth beam 805d.

Additionally, or alternatively, the UE 120a may receive the first system information may be received using one or more first reception parameters that are distinct from one or more second reception parameters that the UE 120b uses to receive the second system information, one or more third reception parameters that the UE 120c uses to receive the third system information, and one or more fourth reception parameters that the UE 120d uses to receive the fourth system information. Accordingly, the transmission method of the first system information may differ from the transmission method of the second system information, the transmission method of the third system information, and the transmission method of the fourth system information.

For example, the one or more first reception parameters may include a repetition associated with the first system information and/or a period associated with the first system information, among other examples. Accordingly, the base station 110 may transmit the first system information with more repetition and/or a shorter period, among other examples, such that coverage for the first system information, transmitted using the first beam 805a, is improved as compared with coverage for the second system information, transmitted using the second beam 805b, the third system information, transmitted using the third beam 805c, and/or the fourth system information, transmitted using the fourth beam 805d.

In some aspects, the content of the second system information may be further distinct from the content of the third system information and/or the content of the fourth system information. Additionally, in some aspects, the content of the third system information may be further distinct from the content of the fourth system information. Additionally, or alternatively, two or more of the content of the second system information, the content of the third system information, and the content of the fourth system information may be the same.

Additionally, or alternatively, in some aspects, the transmission method of the second system information may be further distinct from the transmission method of the third system information and/or the transmission method of the fourth system information. Additionally, in some aspects, the transmission method of the third system information may be further distinct from the transmission method of the fourth system information. Additionally, or alternatively, two or more of the transmission method of the second system information, the transmission method of the third system information, and the transmission method of the fourth system information may be the same.

By using techniques as described in connection with FIG. 8, the base station 110 may transmit system information (e.g., OSI) with different content and/or different transmission methods for different beams. As a result, the base station 110 may configure different UEs (e.g., UE 120a, UE 120b, UE 120c, and UE 120d) with different random access procedure configurations and/or different paging configurations in order to increase reliability and/or quality of communications between the base station 110 and the different UEs.

As indicated above, FIG. 8 is provided as an example. Other examples may differ from what is described with respect to FIG. 8.

Figure 9:
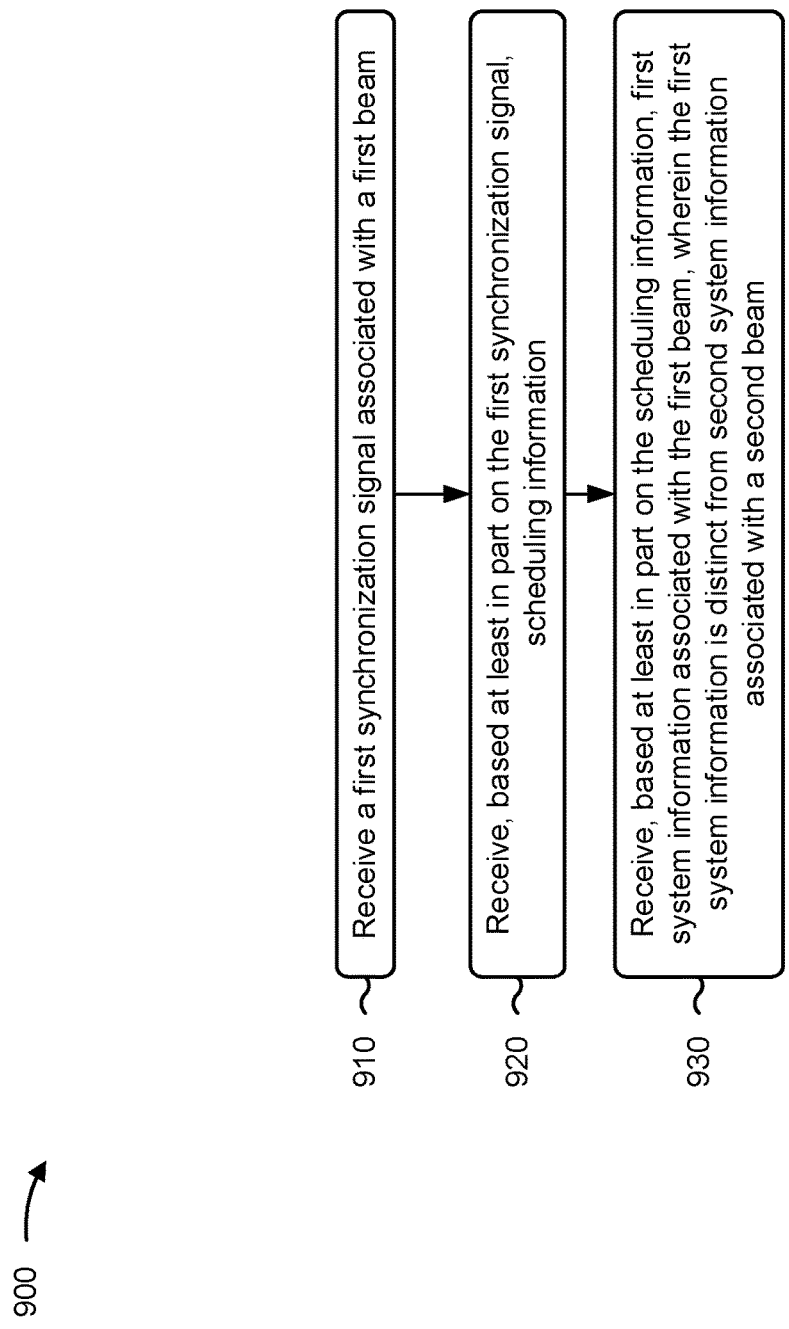
FIGS. 9, 10, 11, and 12 are diagrams illustrating example processes associated with transmitting and receiving beam-dependent system information, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1300 of FIG. 13) performs operations associated with receiving beam-dependent system information.

As shown in FIG. 9, in some aspects, process 900 may include receiving, from a base station (e.g., base station 110 and/or apparatus 1400 of FIG. 14), a first synchronization signal associated with a first beam (block 910). For example, the UE (e.g., using reception component 1302, depicted in FIG. 13) may receive, from a base station, a first synchronization signal associated with a first beam, as described herein.

As shown in FIG. 9, in some aspects, process 900 may include receiving, from the base station and based at least in part on the first synchronization signal, scheduling information (block 920). For example, the UE (e.g., using reception component 1302) may receive, from the base station and based at least in part on the first synchronization signal, scheduling information, as described herein.

As further shown in FIG. 9, in some aspects, process 900 may include receiving, from the base station and based at least in part on the scheduling information, first system information associated with the first beam (block 930). For example, the UE (e.g., using reception component 1302) may receive, from the base station and based at least in part on the scheduling information, first system information associated with the first beam, as described herein. In some aspects, the first system information is distinct from second system information associated with a second beam.

Process 900 may include additional aspects, such as any single aspect or any combination of aspects described below and/or in connection with one or more other processes described elsewhere herein.

In a first aspect, the scheduling information is associated with the first beam and the second beam.

In a second aspect, alone or in combination with the first aspect, the first system information includes OSI, and the scheduling information includes RMSI.

In a third aspect, alone or in combination with one or more of the first and second aspects, the first system information indicates at least one first parameter associated with a random access procedure that is distinct from at least one second parameter indicated by the second system information.

In a fourth aspect, alone or in combination with one or more of the first through third aspects, the at least one first parameter includes a random access repetition for a random access preamble, a random access repetition for an RAR, a length of an RAR window, a number of segments for the RAR window, or a combination thereof.

In a fifth aspect, alone or in combination with one or more of the first through fourth aspects, the first system information indicates at least one first parameter associated with a paging procedure that is distinct from at least one second parameter indicated by the second system information.

In a sixth aspect, alone or in combination with one or more of the first through fifth aspects, the at least one first parameter includes a periodicity associated with the paging procedure, a repetition associated with the paging procedure, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
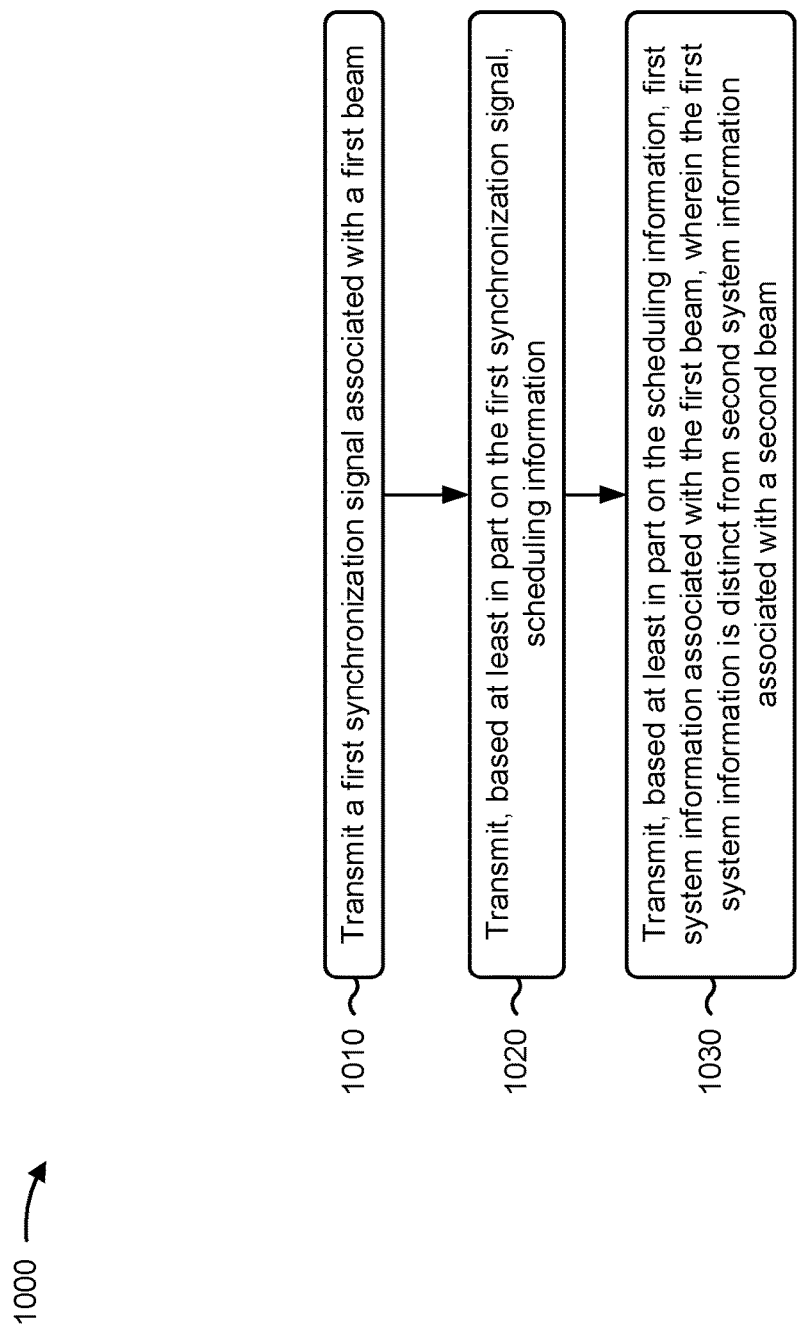

FIG. 10 is a diagram illustrating an example process 1000 performed, for example, by a base station, in accordance with the present disclosure. Example process 1000 is an example where the base station (e.g., base station 110 and/or apparatus 1400 of FIG. 14) performs operations associated with transmitting beam-dependent system information.

As shown in FIG. 10, in some aspects, process 1000 may include transmitting, to a UE (e.g., UE 120 and/or apparatus 1300 of FIG. 13), a first synchronization signal associated with a first beam (block 1010). For example, the base station (e.g., using transmission component 1404, depicted in FIG. 14) may transmit, to a UE, a first synchronization signal associated with a first beam, as described herein.

As shown in FIG. 10, in some aspects, process 1000 may include transmitting, to the UE and based at least in part on the first synchronization signal, scheduling information (block 1020). For example, the base station (e.g., using transmission component 1404) may transmit, to the UE and based at least in part on the first synchronization signal, scheduling information, as described herein.

As further shown in FIG. 10, in some aspects, process 1000 may include transmitting, to the UE and based at least in part on the scheduling information, first system information associated with the first beam (block 1030). For example, the base station (e.g., using transmission component 1404) may transmit, to the UE and based at least in part on the scheduling information, first system information associated with the first beam, as described herein. In some aspects, the first system information is distinct from second system information associated with a second beam.

Process 1000 may include additional aspects, such as any single aspect or any combination of aspects described below and/or in connection with one or more other processes described elsewhere herein.

In a first aspect, the scheduling information is associated with the first beam and the second beam.

In a second aspect, alone or in combination with the first aspect, the first system information includes OSI, and the scheduling information includes RMSI.

In a third aspect, alone or in combination with one or more of the first and second aspects, the first system information indicates at least one first parameter associated with a random access procedure that is distinct from at least one second parameter indicated by the second system information.

In a fourth aspect, alone or in combination with one or more of the first through third aspects, the at least one first parameter includes a random access repetition for a random access preamble, a random access repetition for an RAR, a length of an RAR window, a number of segments for the RAR window, or a combination thereof.

In a fifth aspect, alone or in combination with one or more of the first through fourth aspects, the first system information indicates at least one first parameter associated with a paging procedure that is distinct from at least one second parameter indicated by the second system information.

In a sixth aspect, alone or in combination with one or more of the first through fifth aspects, the at least one first parameter includes a periodicity associated with the paging procedure, a repetition associated with the paging procedure, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
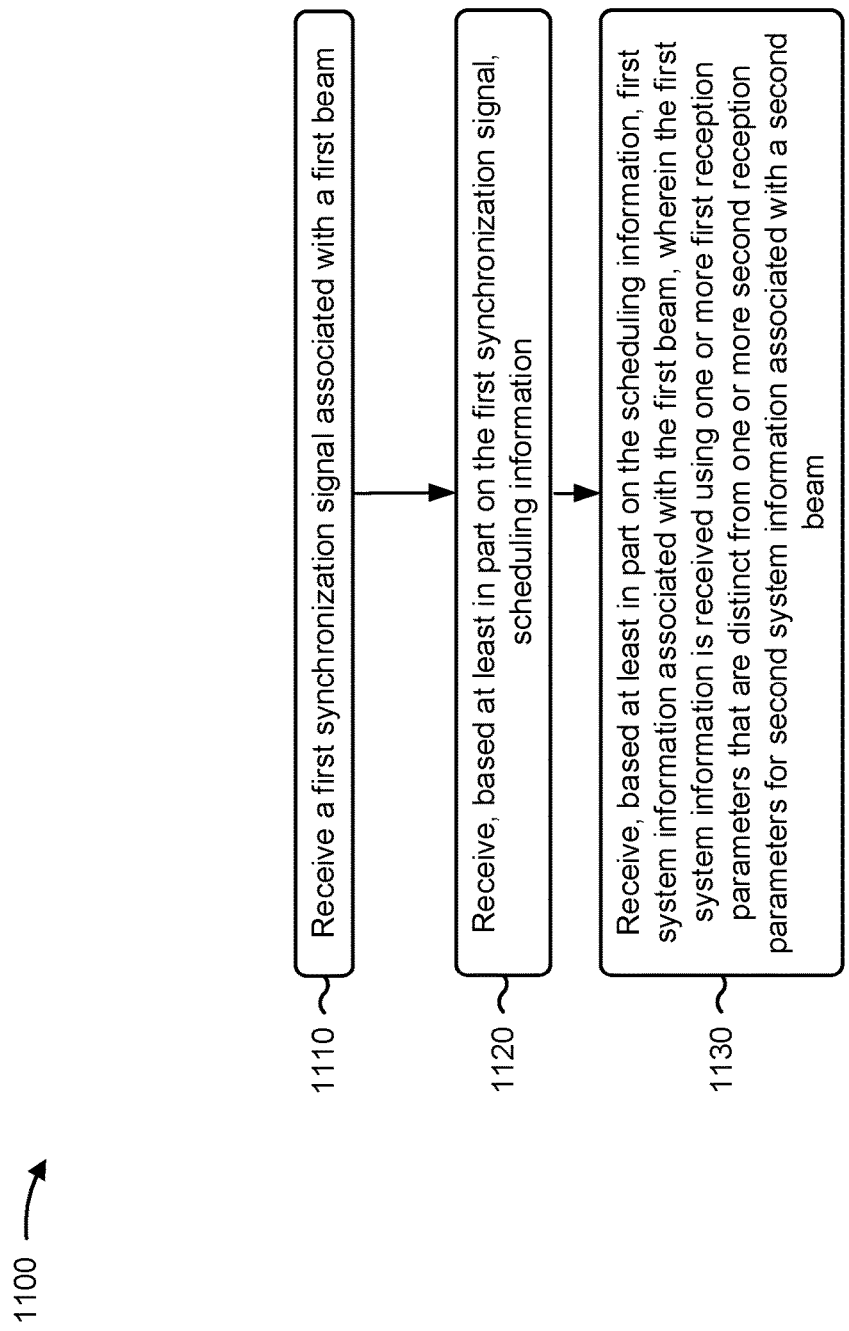

FIG. 11 is a diagram illustrating an example process 1100 performed, for example, by a UE, in accordance with the present disclosure. Example process 1100 is an example where the UE (e.g., UE 120 and/or apparatus 1300 of FIG. 13) performs operations associated with receiving beam-dependent system information.

As shown in FIG. 11, in some aspects, process 1100 may include receiving, from a base station (e.g., base station 110 and/or apparatus 1400 of FIG. 14), a first synchronization signal associated with a first beam (block 1110). For example, the UE (e.g., using reception component 1302, depicted in FIG. 13) may receive, from a base station, a first synchronization signal associated with a first beam, as described herein.

As shown in FIG. 11, in some aspects, process 1100 may include receiving, from the base station and based at least in part on the first synchronization signal, scheduling information (block 1120). For example, the UE (e.g., using reception component 1302) may receive, from the base station and based at least in part on the first synchronization signal, scheduling information, as described herein.

As further shown in FIG. 11, in some aspects, process 1100 may include receiving, from the base station and based at least in part on the scheduling information, first system information associated with the first beam (block 1130). For example, the UE (e.g., using reception component 1302) may receive, from the base station and based at least in part on the scheduling information, first system information associated with the first beam, as described herein. In some aspects, the first system information is received using one or more first reception parameters that are distinct from one or more second reception parameters for second system information associated with a second beam.

Process 1100 may include additional aspects, such as any single aspect or any combination of aspects described below and/or in connection with one or more other processes described elsewhere herein.

In a first aspect, the scheduling information is associated with the first beam and the second beam.

In a second aspect, alone or in combination with the first aspect, the first system information includes OSI, and the scheduling information includes RMSI.

In a third aspect, alone or in combination with one or more of the first and second aspects, the one or more first reception parameters include a repetition associated with the first system information, a periodicity associated with the first system information, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
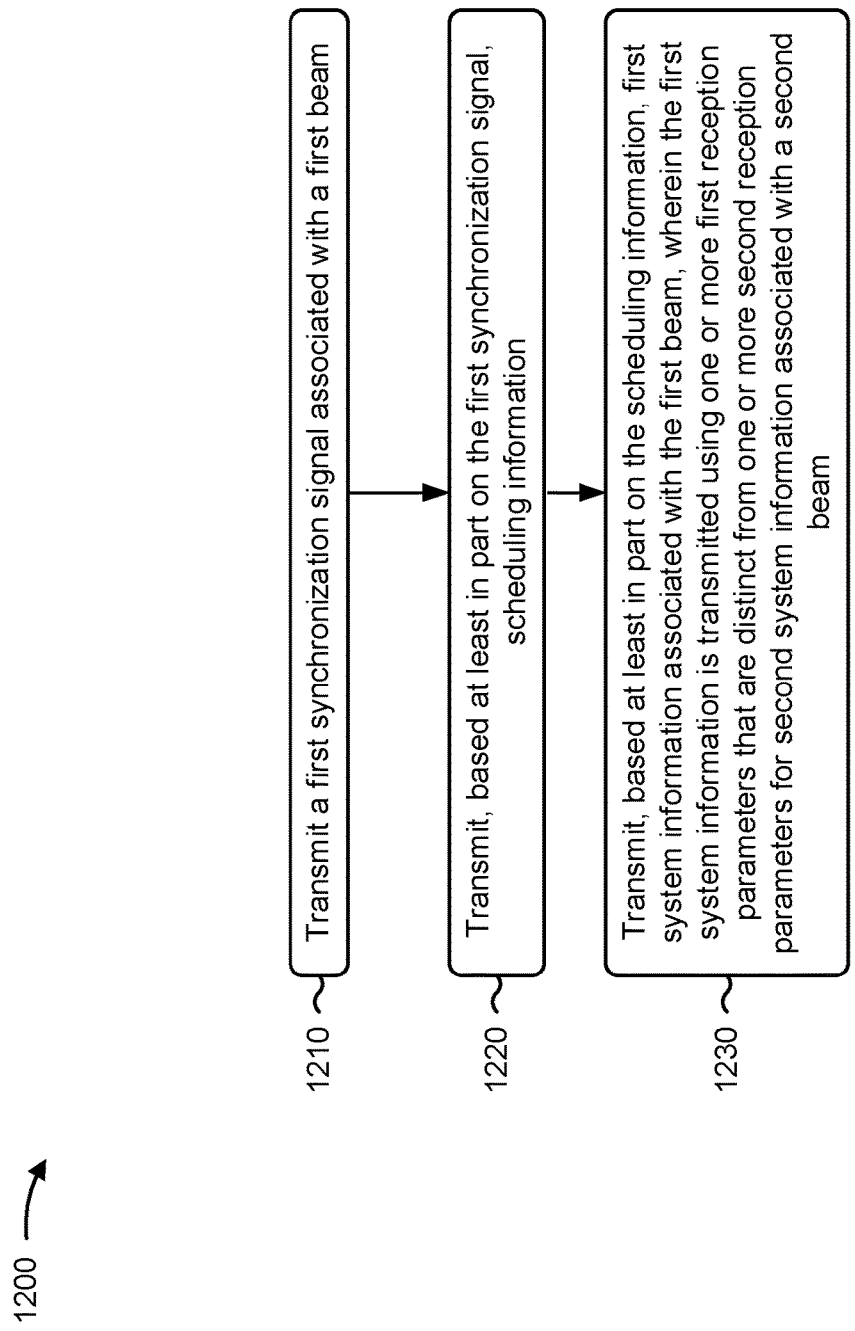

FIG. 12 is a diagram illustrating an example process 1200 performed, for example, by a base station, in accordance with the present disclosure. Example process 1200 is an example where the base station (e.g., base station 110 and/or apparatus 1400 of FIG. 14) performs operations associated with transmitting beam-dependent system information.

As shown in FIG. 12, in some aspects, process 1200 may include transmitting, to a UE (e.g., UE 120 and/or apparatus 1300 of FIG. 13), a first synchronization signal associated with a first beam (block 1210). For example, the base station (e.g., using transmission component 1404, depicted in FIG. 14) may transmit, to a UE, a first synchronization signal associated with a first beam, as described herein.

As shown in FIG. 12, in some aspects, process 1200 may include transmitting, to the UE and based at least in part on the first synchronization signal, scheduling information (block 1220). For example, the base station (e.g., using transmission component 1404) may transmit, to the UE and based at least in part on the first synchronization signal, scheduling information, as described herein.

As further shown in FIG. 12, in some aspects, process 1200 may include transmitting, to the UE and based at least in part on the scheduling information, first system information associated with the first beam (block 1230). For example, the base station (e.g., using transmission component 1404) may transmit, to the UE and based at least in part on the scheduling information, first system information associated with the first beam, as described herein. In some aspects, the first system information is transmitted using one or more first reception parameters that are distinct from one or more second reception parameters for second system information associated with a second beam.

Process 1200 may include additional aspects, such as any single aspect or any combination of aspects described below and/or in connection with one or more other processes described elsewhere herein.

In a first aspect, the scheduling information is associated with the first beam and the second beam.

In a second aspect, alone or in combination with the first aspect, the first system information includes OSI, and the scheduling information includes RMSI.

In a third aspect, alone or in combination with one or more of the first and second aspects, the one or more first reception parameters include a repetition associated with the first system information, a periodicity associated with the first system information, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
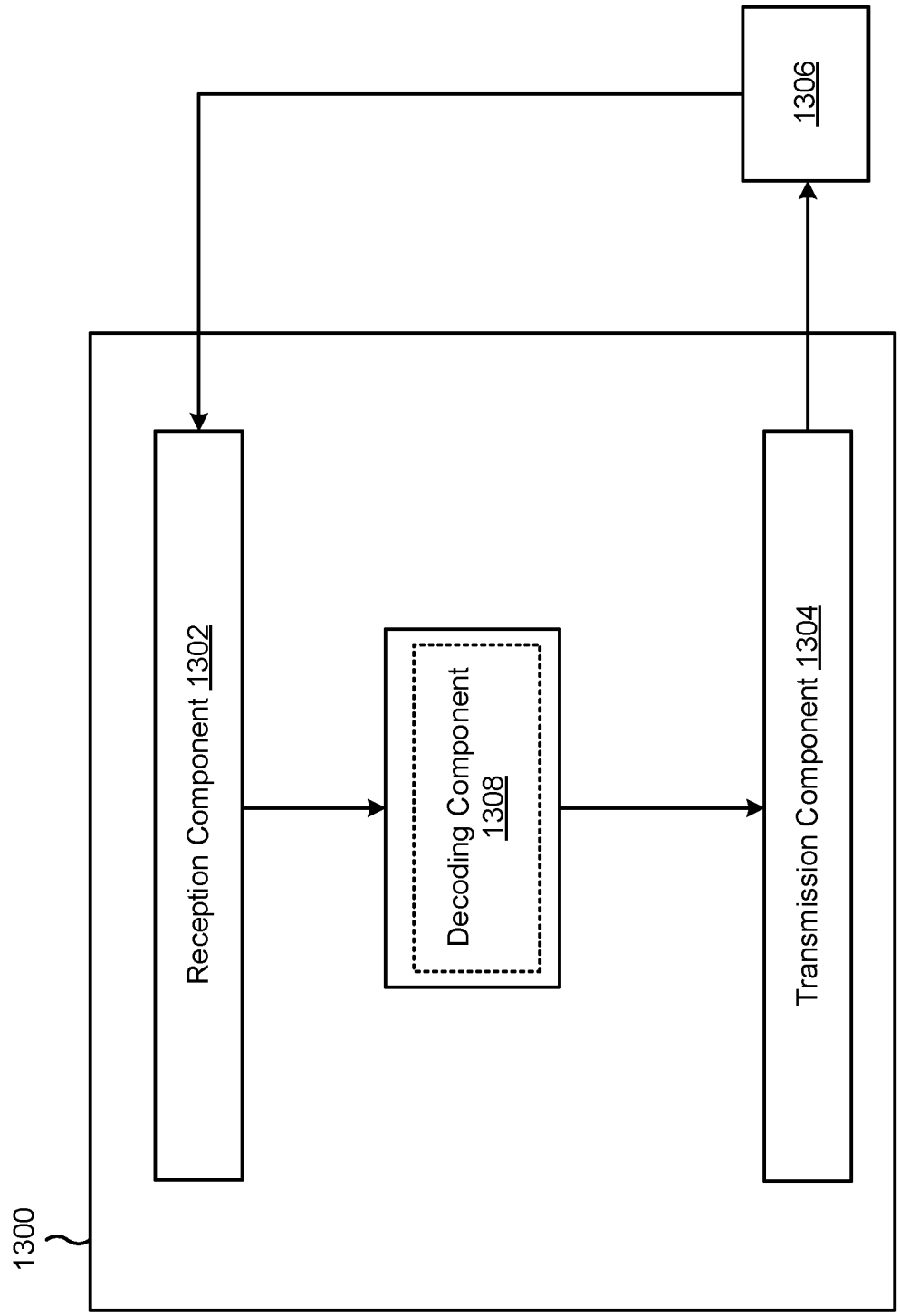
FIGS. 13 and 14 are diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a decoding component 1308, among other examples.

In some aspects, the apparatus 1300 may be configured to perform one or more operations described herein in connection with FIGS. 7-8. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

In some aspects, the reception component 1302 may receive (e.g., from the apparatus 1306) a first synchronization signal associated with a first beam. Additionally, the reception component 1302 may receive (e.g., from the apparatus 1306), based at least in part on the first synchronization signal, scheduling information. Accordingly, the reception component 1302 may receive (e.g., from the apparatus 1306), based at least in part on the scheduling information, first system information associated with the first beam. In some aspects, the first system information is distinct from second system information associated with a second beam.

In some aspects, the decoding component 1308 may decode the first synchronization signal to obtain a CORESET for receiving the scheduling information. In some aspects, the decoding component 1308 may include one or more antennas, a demodulator, a MIMO detector, a receive processor, a controller/processor, a memory, or a combination thereof, of the UE described above in connection with FIG. 2. Additionally, in some aspects, the decoding component 1308 may decode the scheduling information to obtain a CORESET for receiving the first system information.

In some aspects, the transmission component 1304 may transmit (e.g., to the apparatus 1306), based at least in part on the first synchronization signal, a request for the first system information, such that the reception component 1302 receives the first system information based at least in part on the request.

Additionally with, or alternatively to, the aspects described above, the reception component 1302 may receive the first system information using one or more first reception parameters that are distinct from one or more second reception parameters for the second system information associated with the second beam. In some aspects, the decoding component 1308 may decode the first synchronization signal and/or the scheduling information to obtain the one or more first reception parameters.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
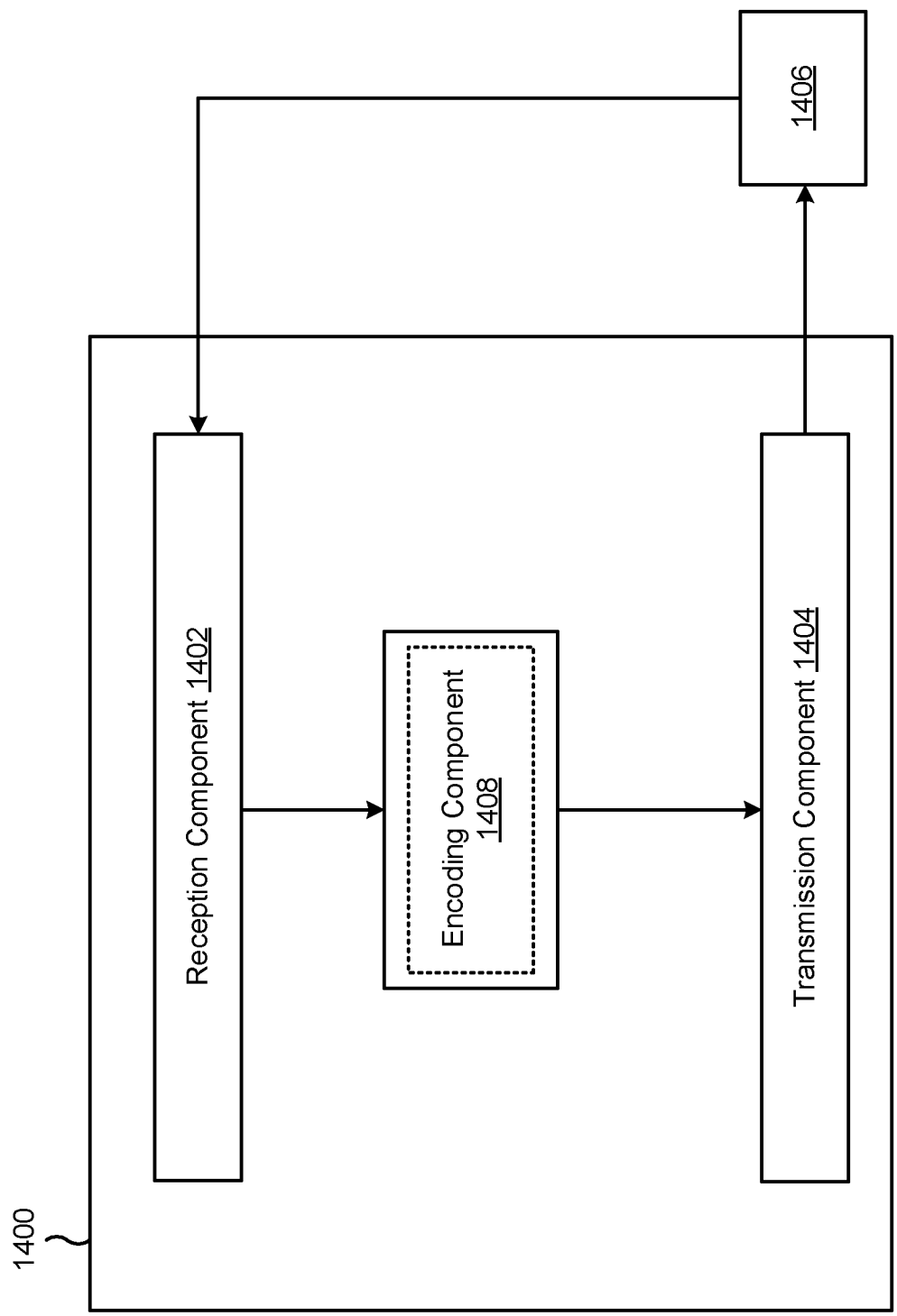

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include an encoding component 1408, among other examples.

In some aspects, the apparatus 1400 may be configured to perform one or more operations described herein in connection with FIGS. 7-8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

In some aspects, the transmission component 1404 may transmit (e.g., to the apparatus 1406) a first synchronization signal associated with a first beam. Additionally, the transmission component 1404 may transmit (e.g., to the apparatus 1406), based at least in part on the first synchronization signal, scheduling information. Accordingly, the transmission component 1404 may transmit (e.g., to the apparatus 1406), based at least in part on the scheduling information, first system information. In some aspects, the first system information is distinct from second system information associated with a second beam.

In some aspects, the encoding component 1408 may encode the first synchronization signal with information defining a CORESET for receiving the scheduling information. In some aspects, the encoding component 1408 may include one or more antennas, a modulator, a transmit MIMO processor, a transmit processor, a controller/processor, a memory, or a combination thereof, of the base station described above in connection with FIG. 2. Additionally, in some aspects, the encoding component 1408 may encode the scheduling information with information defining a CORESET for receiving the first system information.

In some aspects, the reception component 1402 may receive (e.g., from the apparatus 1406), based at least in part on the first synchronization signal, a request for the first system information, such that the transmission component 1404 transmits the first system information based at least in part on the request.

Additionally with, or alternatively to, the aspects described above, the transmission component 1404 may transmit the first system information using one or more first reception parameters that are distinct from one or more second reception parameters for the second system information associated with the second beam. In some aspects, the encoding component 1408 may encode the first synchronization signal and/or the scheduling information with the one or more first reception parameters.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, a first synchronization signal associated with a first beam; receiving, from the base station and based at least in part on the first synchronization signal, scheduling information; and receiving, from the base station and based at least in part on the scheduling information, first system information associated with the first beam, wherein the first system information is distinct from second system information associated with a second beam.

Aspect 2: The method of Aspect 1, wherein the scheduling information is associated with the first beam and the second beam.

Aspect 3: The method of any of Aspects 1 through 2, wherein the first system information comprises other system information (OSI), and the scheduling information comprises remaining minimum system information (RMSI).

Aspect 4: The method of any of Aspects 1 through 3, wherein the first system information indicates at least one first parameter associated with a random access procedure that is distinct from at least one second parameter indicated by the second system information.

Aspect 5: The method of Aspect 4, wherein the at least one first parameter includes: a random access repetition for a random access preamble, a random access repetition for a random access response (RAR), a length of an RAR window, a number of segments for the RAR window, or a combination thereof.

Aspect 6: The method of any of Aspects 1 through 5, wherein the first system information indicates at least one first parameter associated with a paging procedure that is distinct from at least one second parameter indicated by the second system information.

Aspect 7: The method of Aspect 6, wherein the at least one first parameter includes: a periodicity associated with the paging procedure, a repetition associated with the paging procedure, or a combination thereof.

Aspect 8: A method of wireless communication performed by a base station, comprising: transmitting, to a user equipment (UE), a first synchronization signal associated with a first beam; transmitting, to the UE and based at least in part on the first synchronization signal, scheduling information; and transmitting, to the UE and based at least in part on the scheduling information, first system information associated with the first beam, wherein the first system information is distinct from second system information associated with a second beam.

Aspect 9: The method of Aspect 8, wherein the scheduling information is associated with the first beam and the second beam.

Aspect 10: The method of any of Aspects 8 through 9, wherein the first system information comprises other system information (OSI), and the scheduling information comprises remaining minimum system information (RMSI).

Aspect 11: The method of any of Aspects 8 through 10, wherein the first system information indicates at least one first parameter associated with a random access procedure that is distinct from at least one second parameter indicated by the second system information.

Aspect 12: The method of Aspect 11, wherein the at least one first parameter includes: a random access repetition for a random access preamble, a random access repetition for a random access response (RAR), a length of an RAR window, a number of segments for the RAR window, or a combination thereof.

Aspect 13: The method of any of Aspects 8 through 12, wherein the first system information indicates at least one first parameter associated with a paging procedure that is distinct from at least one second parameter indicated by the second system information.

Aspect 14: The method of Aspect 13, wherein the at least one first parameter includes: a periodicity associated with the paging procedure, a repetition associated with the paging procedure, or a combination thereof.

Aspect 15: A method of wireless communication performed by a user equipment (UE), comprising: receiving, from a base station, a first synchronization signal associated with a first beam; receiving, from the base station and based at least in part on the first synchronization signal, scheduling information; and receiving, from the base station and based at least in part on the scheduling information, first system information associated with the first beam, wherein the first system information is received using one or more first reception parameters that are distinct from one or more second reception parameters for second system information associated with a second beam.

Aspect 16: The method of Aspect 15, wherein the scheduling information is associated with the first beam and the second beam.

Aspect 17: The method of any of Aspects 15 through 16, wherein the first system information comprises other system information (OSI), and the scheduling information comprises remaining minimum system information (RMSI).

Aspect 18: The method of any of Aspects 15 through 17, wherein the one or more first reception parameters include: a repetition associated with the first system information, a periodicity associated with the first system information, or a combination thereof.

Aspect 19: A method of wireless communication performed by a base station, comprising: transmitting, to a user equipment (UE), a first synchronization signal associated with a first beam; transmitting, to the UE and based at least in part on the first synchronization signal, scheduling information; and transmitting, to the UE and based at least in part on the scheduling information, first system information associated with the first beam, wherein the first system information is transmitted using one or more first reception parameters that are distinct from one or more second reception parameters for second system information associated with a second beam.

Aspect 20: The method of Aspect 19, wherein the scheduling information is associated with the first beam and the second beam.

Aspect 21: The method of any of Aspects 19 through 20, wherein the first system information comprises other system information (OSI), and the scheduling information comprises remaining minimum system information (RMSI).

Aspect 22: The method of any of Aspects 19 through 21, wherein the one or more first reception parameters include: a repetition associated with the first system information, a periodicity associated with the first system information, or a combination thereof.

Aspect 23: An apparatus for wireless communication at a device, comprising a processor; memory coupled with the processor; and instructions stored in the memory and executable by the processor to cause the apparatus to perform the method of one or more of Aspects 1-7.

Aspect 24: A device for wireless communication, comprising a memory and one or more processors coupled to the memory, the one or more processors configured to perform the method of one or more of Aspects 1-7.

Aspect 25: An apparatus for wireless communication, comprising at least one means for performing the method of one or more of Aspects 1-7.

Aspect 26: A non-transitory computer-readable medium storing code for wireless communication, the code comprising instructions executable by a processor to perform the method of one or more of Aspects 1-7.

Aspect 27: A non-transitory computer-readable medium storing a set of instructions for wireless communication, the set of instructions comprising one or more instructions that, when executed by one or more processors of a device, cause the device to perform the method of one or more of Aspects 1-7.

Aspect 28: An apparatus for wireless communication at a device, comprising a processor; memory coupled with the processor; and instructions stored in the memory and executable by the processor to cause the apparatus to perform the method of one or more of Aspects 8-14.

Aspect 29: A device for wireless communication, comprising a memory and one or more processors coupled to the memory, the one or more processors configured to perform the method of one or more of Aspects 8-14.

Aspect 30: An apparatus for wireless communication, comprising at least one means for performing the method of one or more of Aspects 8-14.

Aspect 31: A non-transitory computer-readable medium storing code for wireless communication, the code comprising instructions executable by a processor to perform the method of one or more of Aspects 8-14.

Aspect 32: A non-transitory computer-readable medium storing a set of instructions for wireless communication, the set of instructions comprising one or more instructions that, when executed by one or more processors of a device, cause the device to perform the method of one or more of Aspects 8-14.

Aspect 33: An apparatus for wireless communication at a device, comprising a processor; memory coupled with the processor; and instructions stored in the memory and executable by the processor to cause the apparatus to perform the method of one or more of Aspects 15-18.

Aspect 34: A device for wireless communication, comprising a memory and one or more processors coupled to the memory, the one or more processors configured to perform the method of one or more of Aspects 15-18.

Aspect 35: An apparatus for wireless communication, comprising at least one means for performing the method of one or more of Aspects 15-18.

Aspect 36: A non-transitory computer-readable medium storing code for wireless communication, the code comprising instructions executable by a processor to perform the method of one or more of Aspects 15-18.

Aspect 37: A non-transitory computer-readable medium storing a set of instructions for wireless communication, the set of instructions comprising one or more instructions that, when executed by one or more processors of a device, cause the device to perform the method of one or more of Aspects 15-18.

Aspect 38: An apparatus for wireless communication at a device, comprising a processor; memory coupled with the processor; and instructions stored in the memory and executable by the processor to cause the apparatus to perform the method of one or more of Aspects 19-22.

Aspect 39: A device for wireless communication, comprising a memory and one or more processors coupled to the memory, the one or more processors configured to perform the method of one or more of Aspects 19-22.

Aspect 40: An apparatus for wireless communication, comprising at least one means for performing the method of one or more of Aspects 19-22.

Aspect 41: A non-transitory computer-readable medium storing code for wireless communication, the code comprising instructions executable by a processor to perform the method of one or more of Aspects 19-22.

Aspect 42: A non-transitory computer-readable medium storing a set of instructions for wireless communication, the set of instructions comprising one or more instructions that, when executed by one or more processors of a device, cause the device to perform the method of one or more of Aspects 19-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a base station, a first synchronization signal associated with a first beam;
      receive, from the base station and based at least in part on the first synchronization signal, scheduling information indicating repetition or periodicity parameters for reception of first system information; and
      receive, from the base station and based at least in part on the scheduling information and the repetition or periodicity parameters, the first system information comprising first other system information (OSI) associated with the first beam, wherein the first OSI is distinct from second OSI, in second system information, associated with a second beam, wherein the first OSI indicates at least one first parameter associated with a random access procedure that is distinct from at least one second parameter associated with the random access procedure indicated by the second OSI.

2. The apparatus of claim 1, wherein the scheduling information is associated with the first beam and the second beam.

3. The apparatus of claim 1, wherein the scheduling information comprises remaining minimum system information (RMSI).

4. The apparatus of claim 1, wherein the at least one first parameter includes:
   a random access repetition for a random access preamble,
   a random access repetition for a random access response (RAR),
   a length of an RAR window,
   a number of segments for the RAR window, or
   a combination thereof.

5. The apparatus of claim 1, wherein the first OSI indicates at least one first parameter associated with a paging procedure that is distinct from at least one second parameter associated with the paging procedure indicated by the second OSI.

6. The apparatus of claim 5, wherein the at least one first parameter includes:
   a periodicity associated with the paging procedure,
   a repetition associated with the paging procedure, or
   a combination thereof.

7. An apparatus for wireless communication at a base station, comprising:
   one or more memories; and
   one or more processors, coupled to the one or more memories, configured to:
      transmit, to a user equipment (UE), a first synchronization signal associated with a first beam;
      transmit, from the base station and based at least in part on the first synchronization signal, scheduling information indicating repetition or periodicity parameters for transmission of first system information; and
      transmit, to the UE and based at least in part on the scheduling information and the repetition or periodicity parameters, the first system information comprising first other system information (OSI) associated with the first beam, wherein the first OSI is distinct from second OSI, in second system information, associated with a second beam, wherein the first OSI indicates at least one first parameter associated with a random access procedure that is distinct from at least one second parameter associated with the random access procedure indicated by the second OSI.

8. The apparatus of claim 7, wherein the scheduling information is associated with the first beam and the second beam.

9. The apparatus of claim 7, wherein the scheduling information comprises remaining minimum system information (RMSI).

10. The apparatus of claim 7, wherein the at least one first parameter includes:
a random access repetition for a random access preamble,
a random access repetition for a random access response (RAR),
a length of an RAR window,
a number of segments for the RAR window, or
a combination thereof.

11. The apparatus of claim 7, wherein the first OSI indicates at least one first parameter associated with a paging procedure that is distinct from at least one second parameter associated with the paging procedure indicated by the second OSI.

12. The apparatus of claim 11, wherein the at least one first parameter includes:
a periodicity associated with the paging procedure,
a repetition associated with the paging procedure, or
a combination thereof.

13. An apparatus for wireless communication at a user equipment (UE), comprising:
one or more memories; and
one or more processors, coupled to the one or more memories, configured to:
receive, from a base station, a first synchronization signal associated with a first beam;
receive, from the base station and based at least in part on the first synchronization signal, scheduling information indicating repetition or periodicity parameters for reception of first system information; and
receive, from the base station and based at least in part on the scheduling information and the repetition or periodicity parameters, the first system information comprising first other system information (OSI) associated with the first beam, wherein the first OSI is received using one or more first reception parameters that are distinct from one or more second reception parameters for second OSI, in second system information, associated with a second beam, wherein the first OSI indicates at least one first parameter associated with a random access procedure that is distinct from at least one second parameter associated with the random access procedure indicated by the second OSI.

14. The apparatus of claim 13, wherein the scheduling information is associated with the first beam and the second beam.

15. The apparatus of claim 13, wherein the scheduling information comprises remaining minimum system information (RMSI).

16. The apparatus of claim 13, wherein the one or more first reception parameters include:
a repetition associated with the first system information,
a periodicity associated with the first system information, or
a combination thereof.

17. An apparatus for wireless communication at a base station, comprising:
one or more memories; and
one or more processors, coupled to the one or more memories, configured to:
transmit, to a user equipment (UE), a first synchronization signal associated with a first beam;
transmit, from the base station and based at least in part on the first synchronization signal, scheduling information indicating repetition or periodicity parameters for transmission of first system information; and
transmit, to the UE and based at least in part on the scheduling information, first system information comprising first other system information (OSI) associated with the first beam, wherein the first OSI is transmitted using one or more first reception parameters that are distinct from one or more second reception parameters for second OSI, in second system information, associated with a second beam, wherein the first OSI indicates at least one first parameter associated with a random access procedure that is distinct from at least one second parameter associated with the random access procedure indicated by the second OSI.

18. The apparatus of claim 17, wherein the scheduling information is associated with the first beam and the second beam.

19. The apparatus of claim 17, wherein the scheduling information comprises remaining minimum system information (RMSI).

20. The apparatus of claim 17, wherein the one or more first reception parameters include:
a repetition associated with the first system information,
a periodicity associated with the first system information, or
a combination thereof.

21. The apparatus of claim 1, wherein the first system information indicates a control resource set (CORESET) for reception of the first OSI.

22. The apparatus of claim 1, wherein the second system information indicates a control resource set (CORESET) for reception of the second OSI.

* * * * *